US010795227B2

(12) United States Patent
Chen et al.

(10) Patent No.: US 10,795,227 B2
(45) Date of Patent: Oct. 6, 2020

(54) DISPLAY DEVICE

(71) Applicant: Au Optronics Corporation, Hsinchu (TW)

(72) Inventors: Ju-Chin Chen, Taipei (TW); Min-Hsuan Chiu, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/503,630

(22) Filed: Jul. 5, 2019

(65) Prior Publication Data
US 2020/0264463 A1     Aug. 20, 2020

(30) Foreign Application Priority Data
Feb. 20, 2019   (TW) .............................. 108105690 A

(51) Int. Cl.
*G02F 1/1347*   (2006.01)
*G02F 1/1362*   (2006.01)
*G02F 1/1343*   (2006.01)
*G02F 1/1368*   (2006.01)

(52) U.S. Cl.
CPC .......... *G02F 1/1347* (2013.01); *G02F 1/1368* (2013.01); *G02F 1/134363* (2013.01); *G02F 1/136209* (2013.01); *G02F 2001/134345* (2013.01)

(58) Field of Classification Search
None
See application file for complete search history.

(56) References Cited

U.S. PATENT DOCUMENTS

| | | | | |
|---|---|---|---|---|
| 9,252,186 | B1* | 2/2016 | Kim | G02F 1/133514 |
| 2002/0085140 | A1* | 7/2002 | Ko | G02F 1/136209 349/43 |
| 2012/0075434 | A1* | 3/2012 | Kim | H04N 13/305 348/51 |
| 2013/0106923 | A1* | 5/2013 | Shields | G09G 3/3406 345/690 |
| 2013/0335682 | A1* | 12/2013 | Gilbert | H04N 13/332 349/85 |

(Continued)

*Primary Examiner* — Ryan Crockett
(74) *Attorney, Agent, or Firm* — JCIPRNET

(57) ABSTRACT

A display panel including a dimming panel and a display panel is provided. The dimming panel includes a light-shielding structure. The display panel is disposed on the dimming panel and includes a repeat unit including a first pixel unit, a second pixel unit and a third pixel unit, wherein each of the first pixel unit, the second pixel unit and the third pixel unit includes a first color sub-pixel, a second color sub-pixel and a third color sub-pixel, wherein the arrangement of the first color sub-pixel, the second color sub-pixel and the third color sub-pixel in the first pixel unit, the arrangement of the first color sub-pixel, the second color sub-pixel and the third color sub-pixel in the second pixel unit and the arrangement of the first color sub-pixel, the second color sub-pixel and the third color sub-pixel in the third pixel unit are different from each other, and the total area shielded by the light-shielding structure of the first color sub-pixels in the repeat unit, the total area shielded by the light-shielding structure of the second color sub-pixels in the repeat unit and the total area shielded by the light-shielding structure of the third color sub-pixels in the repeat unit are equal.

16 Claims, 19 Drawing Sheets

(56) References Cited

U.S. PATENT DOCUMENTS

| | | | |
|---|---|---|---|
| 2016/0189669 A1* | 6/2016 | Yang | G09G 3/3607 |
| | | | 345/589 |
| 2016/0284768 A1* | 9/2016 | Phan | H01L 27/3218 |
| 2017/0248827 A1* | 8/2017 | Zhang | G02F 1/136209 |
| 2018/0211580 A1* | 7/2018 | Su | G09G 3/2003 |
| 2018/0341132 A1* | 11/2018 | Suzuki | G02F 1/1337 |
| 2019/0271878 A1* | 9/2019 | Tsuruda | G02F 1/1677 |

* cited by examiner

DISPLAY DEVICE

CROSS-REFERENCE TO RELATED APPLICATION

This application claims the priority benefit of Taiwan application serial no. 108105690, filed on Feb. 20, 2019. The entirety of the above-mentioned patent application is hereby incorporated by reference herein and made a part of this specification.

BACKGROUND

Technical Field

The present invention relates to a display device, and more particularly to a non-self-emitting display device.

Description of Related Art

In recent years, as display technology continues to be vigorously developed, many electronic devices such as vehicle dashboards, watches, and game machines have been converted from early mechanical physical structures to planar digital display devices to provide users with personalized information from the display device. In general, vehicle dashboards require the characteristic of high contrast so that users can clearly obtain information from the vehicle dashboard in different driving environments. At present, the backlight module which usually using local dimming is provided to adjust the contrast of the liquid crystal display device, but this technology has many problems such as increased manufacturing cost, increased power consumption and/or increased weight. Therefore, the development of high-contrast display devices is still one of the goals of current technicians in this field.

SUMMARY

At least one embodiment of the present invention provides a display device having high contrast, good transmittance, and capable of avoiding or reducing color moiré effect.

A display device according to at least one embodiment of the present invention includes a backlight module, a dimming panel, and a display panel. The dimming panel is disposed on the backlight module and includes a light-shielding structure, a plurality of first active elements, and a plurality of control electrodes. Each of the control electrodes is electrically connected to one of the first active elements. The display panel is disposed on the dimming panel and includes a first repeat unit, the first repeat unit includes at least one first pixel unit, at least one second pixel unit and at least one third pixel unit, each of the at least one first pixel unit, the at least one second pixel unit and the at least one third pixel unit includes a first color sub-pixel, a second color sub-pixel and a third color sub-pixel, wherein an arrangement of the first color sub-pixel, the second color sub-pixel and the third color sub-pixel in the first pixel unit, an arrangement of the first color sub-pixel, the second color sub-pixel and the third color sub-pixel in the second pixel unit and an arrangement of a first color sub-pixel, a second color sub-pixel and a third color sub-pixel in the third pixel unit are different from each other, and a total area shielded by the light-shielding structure of the first color sub-pixels in the first repeat unit, a total area shielded by the light-shielding structure of the second color sub-pixels in the first repeat unit and a total area shielded by the light-shielding structure of the third color sub-pixels in the first repeat unit are substantially equal.

Based on the above, in the display device according to at least one embodiment of the present invention, the dimming panel disposed on the backlight module includes the light-shielding structure, the first active elements and the control electrodes electrically connected to the first active elements, the display panel disposed on the dimming panel includes the repeat unit having the at least one first pixel unit, the at least one second pixel unit and the at least one third pixel unit, each of the at least one first pixel unit, the at least one second pixel unit and the at least one third pixel unit includes the first color sub-pixel, the second color sub-pixel and the third color sub-pixel, the arrangement of the first color sub-pixel, the second color sub-pixel and the third color sub-pixel in the first pixel unit, the arrangement of the first color sub-pixel, the second color sub-pixel and the third color sub-pixel in the second pixel unit and the arrangement of the first color sub-pixel, the second color sub-pixel and the third color sub-pixel in the third pixel unit are different from each other, and the total area shielded by the light-shielding structure of the first color sub-pixels in the repeat unit, the total area shielded by the light-shielding structure of the second color sub-pixels in the repeat unit and the total area shielded by the light-shielding structure of the third color sub-pixels in the repeat unit are substantially equal, so that the display device can have high contrast, good transmittance and can avoid or reduce color moiré effect.

The above described features and advantages of the present invention will be more apparent from the following description.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

The term "about," "approximately," "essentially" or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about," "approximately," "essentially" or "substantially" as used herein based on measuring properties, cutting properties or other properties, instead of applying one standard deviation across all the properties.

It should be understood that when an element such as a layer, film, region or substrate is referred to as being "on," "connected to" or "in contact with" another element, it can be directly on, connected to or in contact with the other element, or intervening elements may also be present. In contrast, when an element is referred to as being "directly on," "directly connected to" or "directly in contact with" another element, there are no intervening elements present. As used herein, the term "connected" may refer to physically connected and/or electrically connected. Therefore, intervening elements may be present in an electrical connection between two elements.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Figure 1:
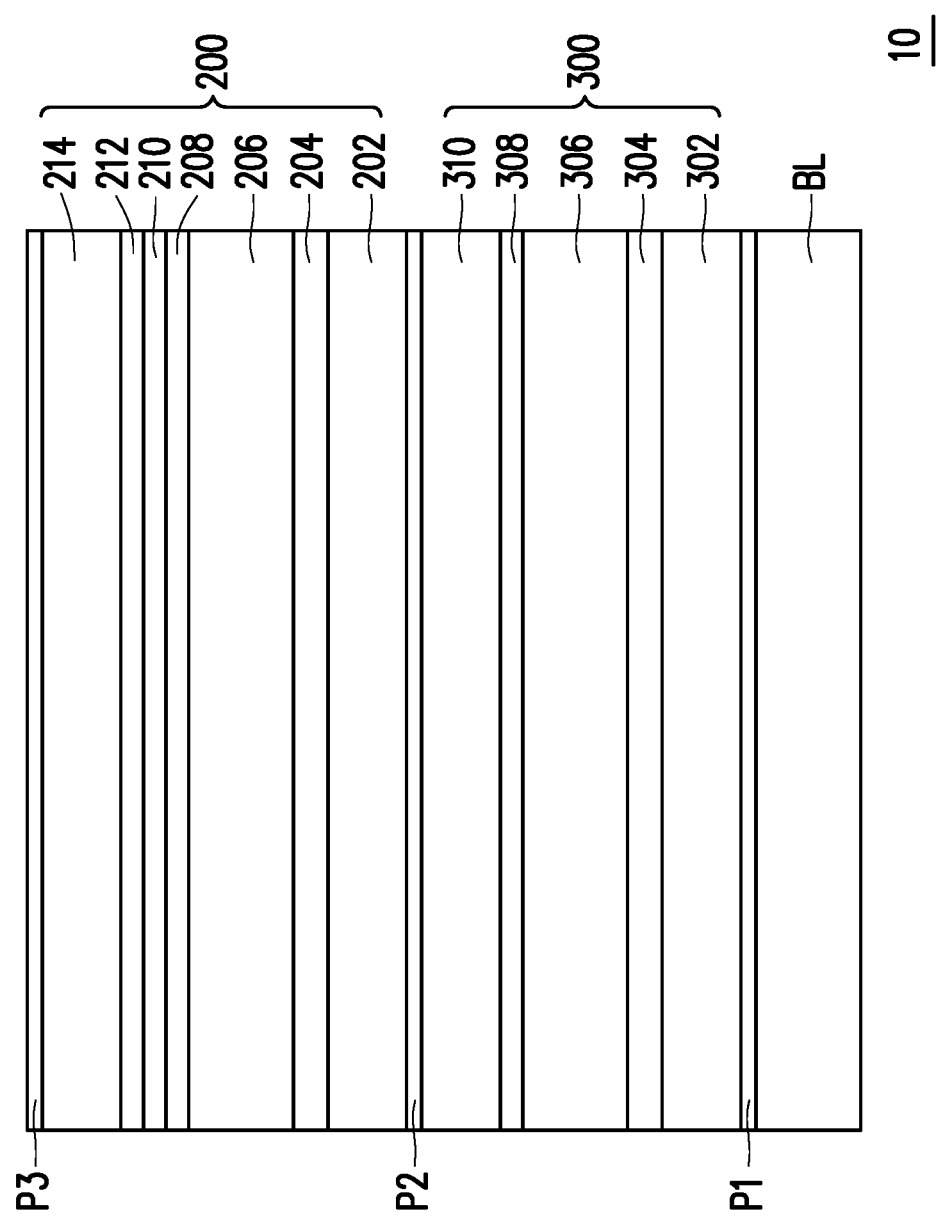
FIG. 1 is a schematic cross-sectional view of a display device in accordance with an embodiment of the present invention.
Figure 2:
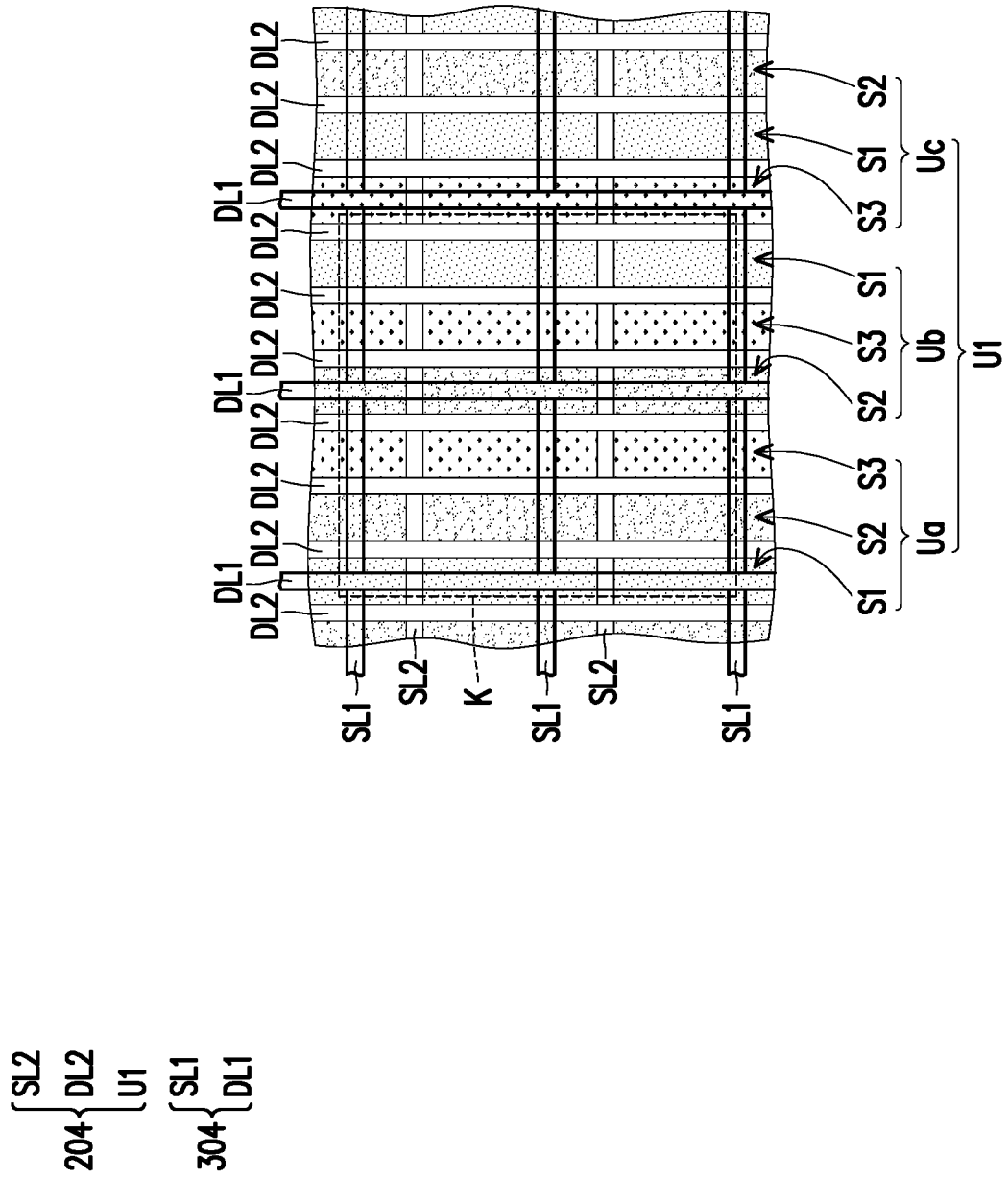
FIG. 2 is a schematic diagram showing an overlapping relationship between a pixel array layer of a display panel and an element layer of a dimming panel according to an embodiment of the invention.
Figure 3:
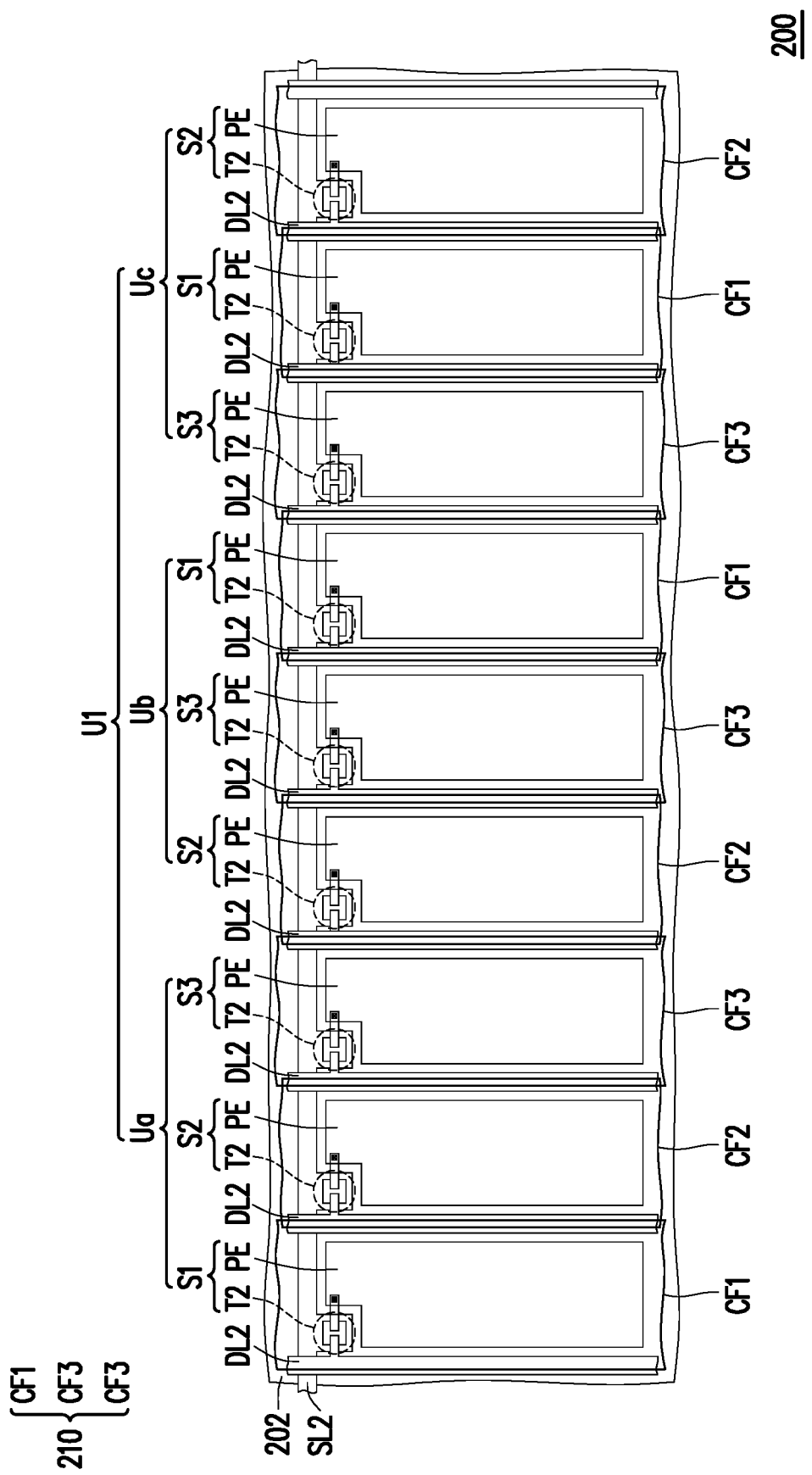
FIG. 3 is a partial schematic top view of a display panel in accordance with an embodiment of the present invention.
Figure 4:
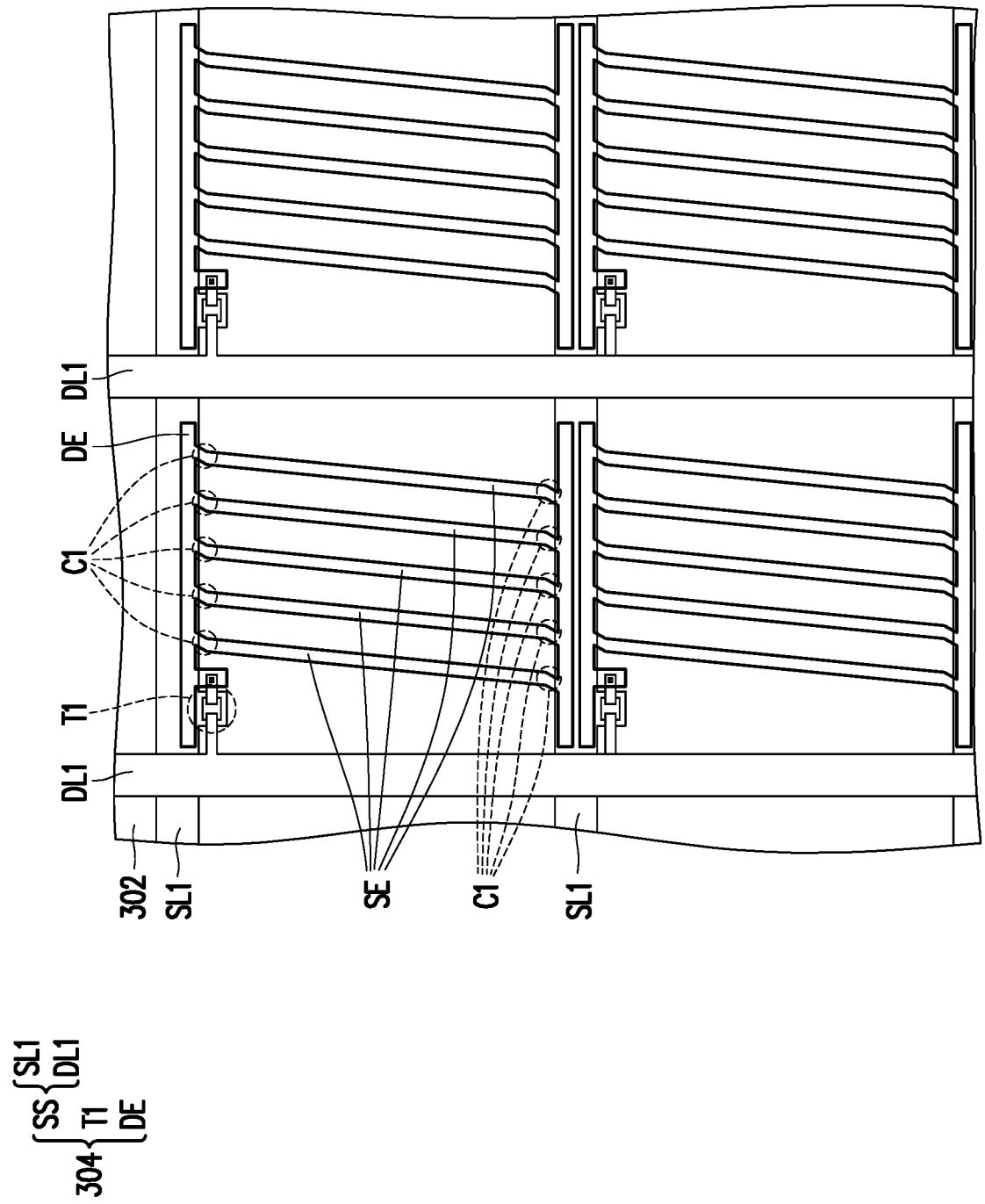
FIG. 4 is a partial schematic top view of a dimming panel according to an embodiment of the invention.

FIG. 1 is a schematic cross-sectional view of a display device in accordance with an embodiment of the present invention. FIG. 2 is a schematic diagram showing an overlapping relationship between a pixel array layer of a display panel and an element layer of a dimming panel according to an embodiment of the invention. FIG. 3 is a partial schematic top view of a display panel according to an embodiment of the invention. FIG. 4 is a partial schematic top view of a dimming panel in accordance with an embodiment of the present invention. For the sake of clarity, some of the film layers and components are omitted in each of FIG. 2, FIG. 3 and FIG. 4. In addition, FIG. 4 illustrates a portion of the dimming panel 300 corresponding to the region K of FIG. 2.

Referring to FIG. 1, a display device 10 may include a backlight module BL, a display panel 200, and a dimming panel 300. In the embodiment, the dimming panel 300 is disposed on the backlight module BL, and the display panel 200 is disposed on the dimming panel 300. From another point of view, the dimming panel 300 is disposed between the backlight module BL and the display panel 200. In addition, in the present embodiment, the display device 10 may further include a polarizing structure P1, a polarizing structure P2, and a polarizing structure P3. In the present embodiment, the polarizing structure P1 is located between the backlight module BL and the dimming panel 300, the polarizing structure P2 is located between the dimming panel 300 and the display panel 200, and the polarizing structure P3 is located on one side of the display panel 200 away from the dimming panel 300. In the present embodiment, each of the polarizing structure P1, the polarizing structure P2 and the polarizing structure P3 is, for example, a polarizer or any polarizing structure known to those skilled in the art and used to allow the light of the specific polarization state to pass through, but the invention is not limited thereto.

In this embodiment, the backlight module BL is adapted to provide a planar light source, and the light emitted by the planar light source sequentially passes through the dimming panel 300 and the display panel 200 to provide a display screen. In the embodiment, the type of the light source used by the backlight module BL may include: a fluorescent lamp (e.g., a cold cathode fluorescent lamp, a hot cathode fluorescent lamp, an external electrode fluorescent lamp, a flat fluorescent lamp, other suitable lamps, or combinations thereof), a point source (e.g., an inorganic light emitting diode, an organic micromolecule phosphorescent/fluorescent light emitting diode, an organic macromolecule phosphorescent/fluorescent light emitting diode, other suitable diodes, or combinations thereof), a plasma type panel light source, a carbon nanotube light source, other suitable types of light sources, or combinations thereof. In addition, in the embodiment, the backlight module BL may be an edge type backlight module, a direct type backlight module, or other suitable backlight module.

Referring to FIG. 1 to FIG. 3, in the embodiment, the display panel 200 may include a substrate 202, a pixel array layer 204, a liquid crystal layer 206, a common electrode layer 208, a color filter layer 210, a black matrix 212, and a substrate 214. For clarity, the liquid crystal layer 206, the common electrode layer 208, the black matrix 212, and the substrate 214 are omitted in FIG. 3.

The substrate 202 may be made of glass, quartz or organic polymer. The substrate 214 is located opposite to the substrate 202. The substrate 214 may be made of glass, quartz or organic polymer. In the present embodiment, the liquid crystal layer 206 is used as a display medium, which is disposed between the substrate 202 and the substrate 214. In other words, in the embodiment, the display panel 200 is a liquid crystal display panel. However, the invention is not limited thereto. In other embodiments, the display panel 200 may be other suitable non-self-emitting display panels, such as an electrophoretic display panel, an electrowetting display panel, an electric dust display panel, or an electrochromic display panel, without using the liquid crystal layer 206, but using other display medium. In addition, in the present embodiment, the liquid crystal layer 206 includes, for example, in-plane-switching liquid crystal molecules that can be rotated or switched by a horizontal electric field or vertical switching liquid crystal molecules that can be rotated or switched by a vertical electric field, but the invention is not limited thereto.

The pixel array layer 204 is disposed on the substrate 202. In this embodiment, the pixel array layer 204 may include a plurality of scan lines SL2, a plurality of data lines DL2, and a plurality of repeat units U1. For the sake of clarity, FIG. 3 only shows a portion of the display panel 200 corresponding to one repeat unit U1. In the present embodiment, the liquid crystal layer 206 is overlapped with the repeat units U1. In the present embodiment, the extending direction of the scan line SL2 is different from the extending direction of the data line DL2. In addition, in the embodiment, the scan line SL2 and the data line DL2 may be formed from different layers, and an insulating layer (not shown) may be interposed between the scan line SL2 and the data line DL2. Based on the conductivity considerations, the scan line SL2 and the data line DL2 are generally made of a metal material. However, the present invention is not limited thereto. According to other embodiments, the scan line SL2 and the data line DL2 may be made of, for example, an alloy, a nitride of a metal material, an oxide of a metal material, an oxynitride of a metal material, a non-metallic material with conductive property, or other suitable materials. In addition, in the embodiment, the scan line SL2 and the data line DL2 may be a single-layer structure or a multi-layer structure, respectively.

In this embodiment, each repeat unit U1 may include a first pixel unit Ua, a second pixel unit Ub, and a third pixel unit Uc. As shown in FIG. 2 and FIG. 3, in each repeat unit U1, the first pixel unit Ua, the second pixel unit Ub and the third pixel unit Uc are sequentially arranged along the extending direction of one of the scan lines SL2. In this embodiment, each of the first pixel unit Ua, the second pixel unit Ub and the third pixel unit Uc may include a first color sub-pixel S1, a second color sub-pixel S2 and a third color sub-pixel S3. In this embodiment, each of the first color sub-pixels S1, each of the second color sub-pixels S2 and each of the third color sub-pixels S3 are respectively electrically connected to one of the scan lines SL2 and one of the data lines DL2. In this embodiment, each of the first color sub-pixels S1, each of the second color sub-pixels S2 and each of the third color sub-pixels S3 respectively include an active element T2 and a pixel electrode PE electrically connected to the active element T2. The active element T2 may be any thin film transistor known to those of ordinary skill in the art, including, for example, a gate, a channel layer, a source, and a drain (not labeled). In the present embodiment, the pixel electrode PE is a block pixel electrode, but the present invention is not limited thereto. In other embodiments, the pixel electrode PE may be any pixel electrode known to those of ordinary skill in the art, such as a pixel electrode having a slit pattern. In this embodiment, the material of the pixel electrode PE may include a transparent metal oxide conductive material, such as, but not limited to, indium tin oxide, indium zinc oxide, aluminum tin oxide, aluminum zinc oxide, indium gallium zinc oxide, or a stacked layer of at least two of the foregoing materials. As described above, the liquid crystal layer 206 is overlapped with the repeat units U1, and thus the liquid crystal molecules in the liquid crystal layer 206 are driven by the potential difference between the pixel electrode PE and the common electrode layer 208 (described later in detail).

In the present embodiment, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub, and the arrangement of the first color sub-pixel S1, the second color sub-pixel S2 and the third color sub-pixel S3 in the third pixel unit Uc are different from each other. In detail, as shown in FIG. 2 and FIG. 3, in the first pixel unit Ua, the first color sub-pixel S1, the second color sub-pixel S2 and the third color sub-pixel S3 are sequentially arranged along the extending direction of one of the scan lines SL2; in the second pixel unit Ub, the second color sub-pixel S2, the third color sub-pixel S3 and the first color sub-pixel S1 are sequentially arranged along the extending direction of one of the scan lines SL2; and in the third pixel unit Uc, the third color sub-pixel S3, the first color sub-pixel S1 and the second color sub-pixel S2 are sequentially arranged along the extending direction of one of the scan lines SL2.

The black matrix 212 is disposed on the substrate 214. In the embodiment, the black matrix 212 is used to shield elements and traces in the display panel 200 that are not supposed to be observed by the users, such as the scan lines SL2, the data lines DL2, and the active elements T2. Although the present embodiment is based on the case where the black matrix 212 is located on the substrate 214, the present invention is not limited thereto. In other embodiments, the black matrix 212 is located on the substrate 202 and constitutes a black matrix on array (BOA) structure. Further, the material of the black matrix 212 is, for example, a material having low reflectivity such as black resin or light-shielding metal (e.g., chromium).

The color filter layer 210 is disposed on the substrate 214. In this embodiment, the color filter layer 210 may include a plurality of color filter patterns CF1, a plurality of second color filter patterns CF2 and a plurality of third color filter patterns CF3 corresponding to the first color sub-pixels S1, the second color sub-pixels S2 and the third color sub-pixels S3, respectively. As described above, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub, and the arrangement of the first color sub-pixel S1, the second color sub-pixel S2 and the third color sub-pixel S3 in the third pixel unit Uc are different from each other, and therefore the arrangement of the first color filter pattern CF1, the second color filter pattern CF2 and the third color filter pattern CF3 corresponding to the first pixel unit Ua, the arrangement of the first color filter pattern CF1, the second color filter pattern CF2 and the third color filter pattern CF3 corresponding to the second pixel unit Ub, and the arrangement of the first color filter pattern CF1, the second color filter pattern CF2 and the third color filter pattern CF3 corresponding to the third pixel unit Uc are also different from each other. As shown in FIG. 3, corresponding to the first pixel unit Ua, the first color filter pattern CF1, the second color filter pattern CF2 and the third color filter pattern CF3 are sequentially arranged along the extending direction of one of the scan lines SL2; corresponding to the second pixel unit Ub, the second color filter pattern CF2, the third color filter pattern CF3 and the first color filter pattern CF1 are sequentially arranged along the extending direction of one of the scan lines SL2; corresponding to the third pixel unit Uc, the third color filter pattern CF3, the first color filter pattern CF1 and the second color filter pattern CF2 are sequentially arranged along the extending direction of one of the scan lines SL2.

In addition, in the present embodiment, the first color sub-pixel S1, the second color sub-pixel S2 and the third color sub-pixel S3 are a red sub-pixel, a green sub-pixel, and a blue sub-pixel, respectively. That is, the first color filter pattern CF1, the second color filter pattern CF2 and the third color filter pattern CF3 are red, green, and blue, respectively, but the present invention is not limited thereto. In detail, when the liquid crystal molecules in the liquid crystal layer 206 are driven by the potential difference between the pixel electrode PE of the first color sub-pixel S1 and the common electrode layer 208 (described in detail later), the potential difference between the pixel electrode PE of the second color sub-pixel S2 and the common electrode layer 208 (described in detail later), and the potential difference between the pixel electrode PE of the third color sub-pixel S3 and the common electrode layer 208 (described in detail later) to allow the light from the backlight module BL to pass through, then red, green, and blue may be shown respectively. Although the present embodiment is based on the case where the color filter layer 210 is located on the substrate 214, the present invention is not limited thereto. In other embodiments, the color filter layer 210 is disposed on the substrate 202 and constitutes a color filter on array (COA) structure.

The common electrode layer 208 is disposed on the substrate 214. In this embodiment, the material of the common electrode layer 208 may include a transparent metal oxide conductive material, such as, but not limited to, indium tin oxide, indium zinc oxide, aluminum tin oxide, aluminum zinc oxide, indium gallium zinc oxide, or a stacked layer of at least two of the foregoing materials. In this embodiment, the common electrode layer 208 may be electrically connected to a common voltage, which is, for example, about 0 volt.

It is worth mentioning that, according to the above, it should be understood by those of ordinary skill in the art that the display panel 200 includes other components, such as an alignment film, a peripheral driving circuit. In addition, the type of the display panel 200 of the present invention is not limited, and thus the display panel 200 is, for example, a twisted nematic (TN) type display panel, a vertical alignment (VA) type display panel, a fringe field switching (FFS) type display panel, an in-plane switching (IPS) type display panel or an Advanced Hyper-Viewing Angle (AHVA) type display panel. It should be understood by those of ordinary skill in the art that the architecture of the display panel 200 may vary from type to type. For example, when the display panel 200 is a FFS type display panel, an IPS type display panel or an AHVA type display panel, the common electrode layer 208 is disposed on the substrate 202 and may belong to a part of the pixel array layer 204, the pixel electrode PE has a slit pattern.

Referring to FIG. 1, FIG. 2 and FIG. 4, in the embodiment, the dimming panel 300 may include a substrate 302, an element layer 304, a liquid crystal layer 306, a common electrode layer 308, and a substrate 310. For clarity, the liquid crystal layer 306, the common electrode layer 308, and the substrate 310 are omitted in FIG. 4.

The substrates 302, 308 may be made of glass, quartz or organic polymer, respectively. The substrate 310 is located opposite to the substrate 302. In the embodiment, the liquid crystal layer 306 is disposed between the substrate 302 and the substrate 310. In other words, the dimming panel 300 is a liquid crystal type dimming panel. In the present embodiment, the liquid crystal layer 306 includes, for example, in-plane-switching liquid crystal molecules that can be rotated or switched by a horizontal electric field or vertical switching liquid crystal molecules that can be rotated or switched by a vertical electric field, but the present invention is not limited thereto.

The element layer 304 is disposed on the substrate 302. In this embodiment, the element layer 304 may include a plurality of scan lines SL1, a plurality of data lines DL1, a plurality of active elements T1, and a plurality of control electrodes DE. In the present embodiment, the liquid crystal layer 306 is overlapped with the active elements T1 and the control electrodes DE. In the present embodiment, the extending direction of the scan line SL1 is different from the extending direction of the data line DL1. In addition, in the present embodiment, the scan line SL1 and the data line DL1 may be formed from different layers, and an insulating layer (not shown) may be interposed between the scan line SL1 and the data line DL1.

In the present embodiment, the material of the scan line SL1 and the data line DL1 is a light-shielding material, and thus the scan line SL1 and the data line DL1 together may constitute a light-shielding structure SS. The material of the scan line SL1 and the data line DL1 can refer to the material of the foregoing scan line SL2 and the foregoing data line DL2, and details are not described herein. In addition, in the present embodiment, the extending direction of the scan line SL1 is substantially parallel to the extending direction of the scan line SL2, and the extending direction of the data line DL1 is substantially parallel to the extending direction of the data line DL2.

In the present embodiment, in each repeat unit U1, the total area of the first color sub-pixels S1, the total area of the second color sub-pixels S2 and the total area of the third color sub-pixels S3 are substantially equal. Further, in the present embodiment, in each of the repeat units U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal. In other words, in the present embodiment, the overlapped area between the vertical projection of the first color sub-pixels S1 included in each repeat unit U1 on the substrate 302 and the vertical projection of the light-shielding structure SS on the substrate 302, the overlapped area between the vertical projection of the second color sub-pixels S2 included in each repeat unit U1 on the substrate 302 and the vertical projection of the light-shielding structure SS on the substrate 302, and the overlapped area between the vertical projection of the third color sub-pixels S3 included in each repeat unit U1 on the substrate 302 and the vertical projection of the light-shielding structure SS on the substrate 302 are substantially equal to each other. In this way, under the shielding effect of the black matrix 212 and the light-shielding structure SS, the total aperture ratio of the first color sub-pixels S1 in the display device 10, the total aperture ratio of the second color sub-pixels S2 in the display device 10 and the total aperture ratio of the third color sub-pixels S3 in the display device 10 may be substantially equal to each other.

In detail, as shown in FIG. 2, each repeat unit U1 is overlapped with three data lines DL1 and one scan line SL1, wherein all of the first color sub-pixels S1, the second color sub-pixels S2 and the third color sub-pixels S3 in the first pixel unit Ua, the second pixel unit Ub and the third pixel unit Uc are overlapped with the said scan line SL1; only the first color sub-pixel S1 in the first pixel unit Ua is overlapped with the data line DL1; only the second color sub-pixel S2 in the second pixel unit Ub is overlapped with the data line DL1; and only the third color sub-pixel S3 in the third pixel unit Uc is overlapped with the data line DL1. That is, in the present embodiment, in each of the repeat units U1, the sub-pixel overlapped with the data line DL1 of the first pixel unit Ua, the sub-pixel overlapped with the data line DL1 of the second pixel unit Ub and the sub-pixel overlapped with the data line DL1 of the third pixel unit Uc are different from each other.

Further, in the display device 10, the area of any one of the first color sub-pixels S1, the second color sub-pixels S2 and the third color sub-pixels S3 is A, and the area shielded by the light-shielding structure SS of the said any one is B, and A and B satisfy the following relationship: 0%<B/A<about 65%.

In this embodiment, each active element T1 is electrically connected to one of the scan lines SL1 and one of the data lines DL1. The active element T1 may be any thin film transistor known to those of ordinary skill in the art, including, for example, a gate, a channel layer, a source, and a drain (not labeled).

In this embodiment, each of the control electrodes DE is electrically connected to one of the active elements T1. In the present embodiment, each of the control electrodes DE has a plurality of strip electrodes SE. In other words, in the present embodiment, each of the control electrodes DE is an electrode having a slit pattern. However, the invention is not limited thereto. In other embodiments, the control electrode DE may be a bulk electrode.

In detail, as shown in FIG. 4, in each of the control electrodes DE, each strip electrode SE has bent portions C1, wherein each bent portion C1 overlaps the corresponding scan line SL1. It is worth mentioning that although the disclination is easily generated at the bent portion C1 of the strip electrode SE, the bent portion C1 is overlapped with the corresponding scan line SL1, thereby preventing the disclination from affecting the transmittance of the dimming panel 300. In addition, in the present embodiment, each of the control electrodes DE has the strip electrodes SE in a straight line, so that the liquid crystal molecules in the liquid crystal layer 306 may be subjected to a single-domain alignment when driven. However, the invention is not limited to this. In other embodiments, each of the control electrodes DE may have the strip electrodes SE which each has a V shape turned 45 degrees, so that the liquid crystal molecules in the liquid crystal layer 306 may be subjected to multi-domain alignment when driven.

Referring to FIG. 2 and FIG. 4, in the display device 10, each of the control electrodes DE may overlap eight sub-pixels, for example, two first color sub-pixels S1, four second color sub-pixels S2 and two third color sub-pixels S3. In addition, in the display device 10, the horizontal shortest distance between two adjacent data lines DL1 of the dimming panel 300 is approximately equal to the width of one pixel unit (e.g., one first pixel unit Ua, one second pixel unit Ub, or one third pixel unit Uc), and the horizontal shortest distance between two adjacent scan lines SL1 is approximately equal to the length of one pixel unit. In this way, in this embodiment, the resolution of the dimming panel 300 is lower than the resolution of the display panel 200 to avoid reducing the aperture ratio.

As described above, the liquid crystal layer 306 is overlapped with the active elements T1 and the control electrodes DE, and thus the liquid crystal molecules in the liquid crystal layer 306 can determine whether to allow the light from the backlight module BL to pass through via the control of the active elements T1. In detail, the liquid crystal molecules in the liquid crystal layer 306 can be driven by enabling the active element T1 to form a potential difference between the control electrode DE and the common electrode layer 308, whereby the light from the backlight module BL can pass through the dimming panel 300. For example, by enabling some active elements T1, the liquid crystal molecules corresponding to the enabled active elements T1 can be driven to allow the light from the backlight module BL to pass through the dimming panel 300, and the liquid crystal molecules corresponding to the unenabled active elements T1 do not allow the light from the backlight module BL to pass through the dimming panel 300.

The common electrode layer 308 is disposed on the substrate 310. However, the invention is not limited thereto. In other embodiments, the common electrode layer 308 may be disposed on the substrate 302 and belong to a part of the element layer 304. In this embodiment, the material of the common electrode layer 308 may include a transparent metal oxide conductive material, such as, but not limited to, indium tin oxide, indium zinc oxide, aluminum tin oxide, aluminum zinc oxide, indium gallium zinc oxide, or a stacked layer of at least two of the foregoing materials. In this embodiment, the common electrode layer 308 may be electrically connected to a common voltage, which is, for example, about 0 volt.

It is to be noted that, because the dimming panel 300 can control the light from the backlight module BL to pass through therein by divisions, the display device 10 including the backlight module BL, the dimming panel 300 and the display panel 200 sequentially stacked achieves a high contrast effect.

In addition, when the resolution of the dimming panel 300 is different from the resolution of the display panel 200, if the total aperture ratio of the first color sub-pixels S1 in the display device 10, the total aperture ratio of the second color sub-pixels S2 in the display device 10 and the total aperture ratio of the third color sub-pixels S3 in the display device 10 are not equal to each other, color moiré effect is likely to occur. In view of this, in the present embodiment, in each of the repeat units U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, thereby avoiding or reducing color moiré effect. In addition, in other embodiments, the display device 10 may further include a diffusion sheet having lower haze and overlapping the dimming panel 300 to further blur the moiré effect to alleviate the moiré problem and maintain the display device 10 with good transmittance. The haze value of the diffusion sheet is, for example, 20% to 60%. For example, the diffusion sheet having lower haze may be disposed between the dimming panel 300 and the display panel 200, or the display panel 200 may be disposed between the dimming panel 300 and the diffusion sheet having lower haze.

In addition, in the display device 10, although the light from the backlight module BL may pass through the dimming panel 300 and the display panel 200 in sequence, the aperture ratio of the dimming panel 300 is higher than the aperture ratio of the display panel 200, and thus the degree to which the dimming panel 300 affects the transmittance of light can be reduced, thereby improving the transmittance of the display device 10.

In addition, in the dimming panel 300, the scan line SL1 and the data line DL1 together constitute the light-shielding structure SS, but the present invention is not limited thereto. In other embodiments, the light-shielding structure SS may further include a black matrix. Hereinafter, other embodiments will be described with reference to FIG. 5. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 5:
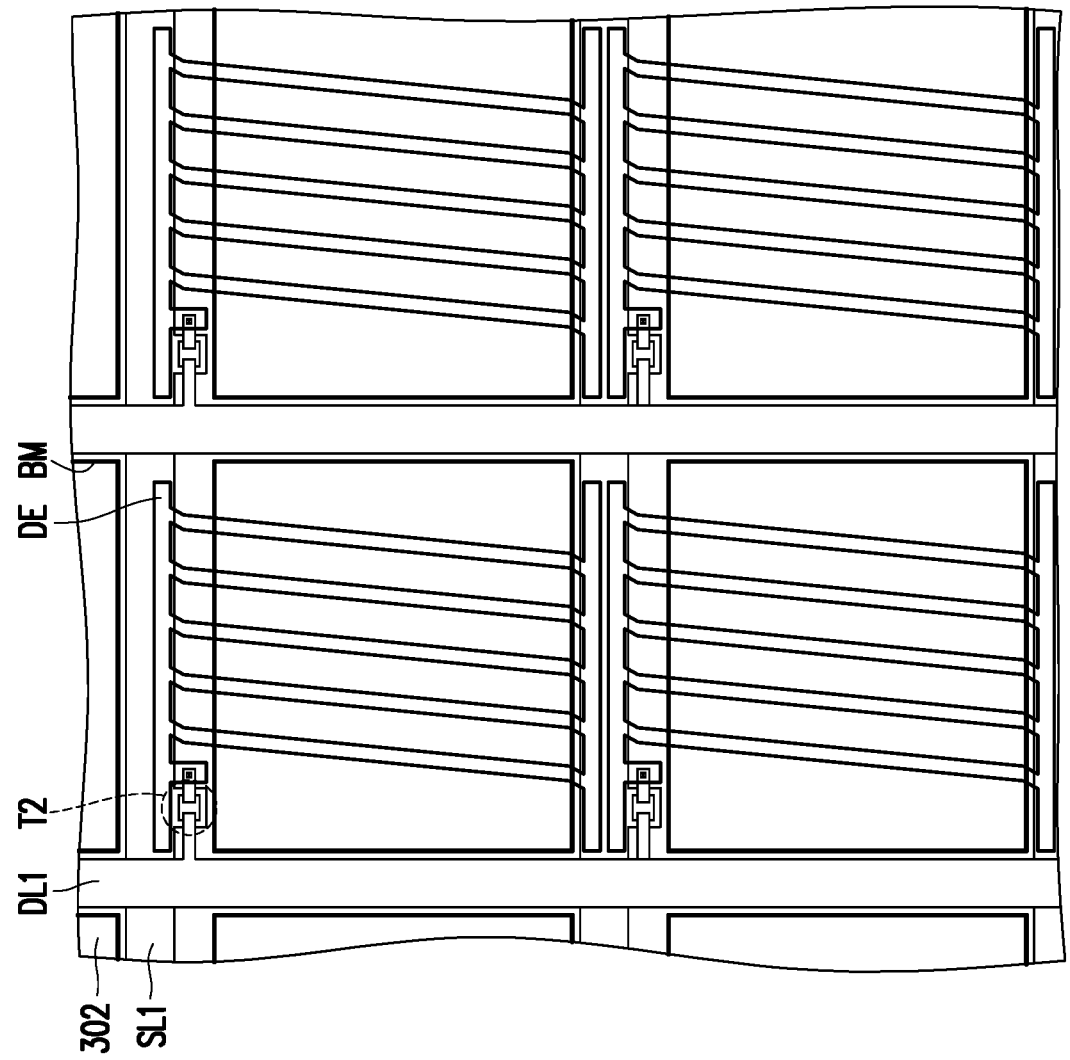
FIG. 5 is a partial schematic top view of a dimming panel according to another embodiment of the present invention.

FIG. 5 is a partial schematic top view of a dimming panel in accordance with another embodiment of the present invention. Referring to FIG. 5 and FIG. 4, the dimming panel 400 of FIG. 5 is similar to the dimming panel 300 of FIG. 4, the difference is mainly that the dimming panel 400 includes a black matrix BM, and the dimming panel 300 does not include a black matrix. Therefore, the difference between the dimming panel 400 of FIG. 5 and the dimming panel 300 of FIG. 4 will be described below, identical or similar elements are denoted by identical or similar reference numerals, and the description of the same technical contents is omitted. The omitted part of the description can refer to the foregoing embodiments.

Referring to FIG. 5, in the present embodiment, the light-shielding structure SS includes the scan lines SL1, the data lines DL1 and the black matrix BM, wherein the black matrix BM is overlapped with the scan lines SL1, the data lines DL1 and the active elements T1. In this way, the black matrix BM can be used to shield elements and traces in the dimming panel 400 that are not supposed to be observed by the users. In the present embodiment, the material of the black matrix BM is, for example, a material having low reflectivity such as black resin or light-shielding metal (e.g., chromium). In addition, according to the foregoing description of the black matrix 212, it should be understood by those of ordinary skill in the art that the black matrix BM may be disposed on the substrate 302 or on the substrate 310, wherein when the black matrix BM is disposed on the substrate 302, then the black matrix on the pixel array (BOA) structure is formed. For the rest, please refer to the foregoing embodiments, and details are not described herein.

In addition, as shown in FIG. 2, in the display device 10, the pixel array layer 204 includes only one type of repeat unit U1, but the present invention is not limited thereto. In other embodiments, the pixel array layer 204 may include at least one repeat unit U1 and other repeat units different from the repeat unit U1. That is, in the case that the total aperture ratio of the first color sub-pixels S1 in the display device, the total aperture ratio of the second color sub-pixels S2 in the display device and the total aperture ratio of the third color sub-pixels S3 in the display device are substantially equal to each other, the architecture of the display panel 200 may be adjusted according to the actual architecture, requirements, and the like of the display device. Hereinafter, other embodiments will be described with reference to FIG. 6. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 6:
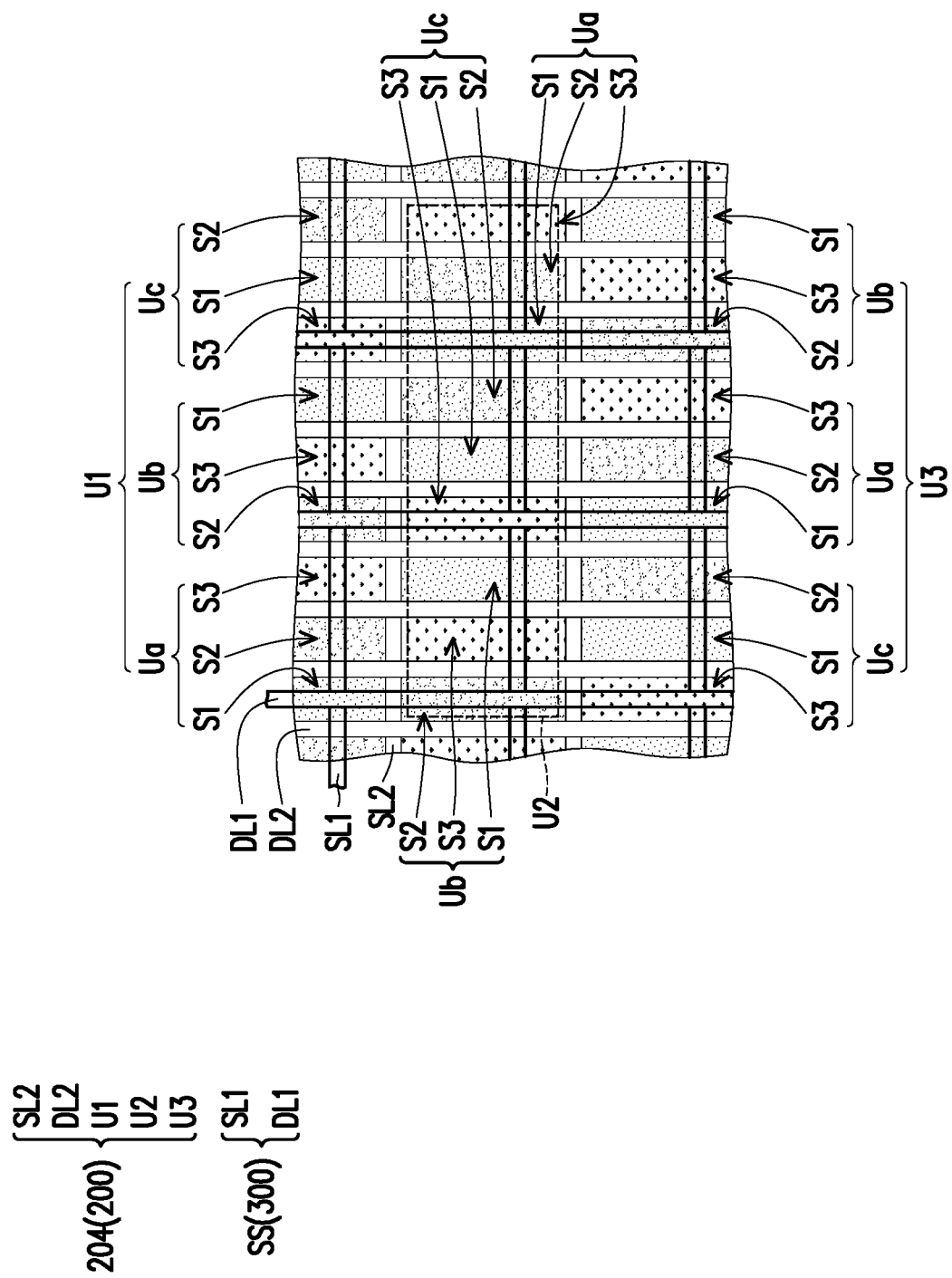
FIG. 6 is a partial schematic top view of a display device in accordance with another embodiment of the present invention.

FIG. 6 is a partial schematic top view of a display device in accordance with another embodiment of the present invention. Referring to FIG. 6 and FIG. 2, the display device 20 of FIG. 6 is similar to the display device 10 of FIG. 2, and therefore identical or similar elements are denoted by identical or similar reference numerals, and the description of the same technical contents is omitted. The omitted part of the description can refer to the foregoing embodiments. Hereinafter, the difference between the display device 20 of FIG. 6 and the display device 10 of FIG. 2 will be described. It should be noted that although many film layers and components are not illustrated in FIG. 6, such as the substrate 302, the black matrix 212, the control electrodes DE, according to the foregoing description of the display device 10 based on FIGS. 1 to 4, the overall structure or layout of the display device 20 should be understood by those of ordinary skill in the art.

Referring to FIG. 6, in the embodiment, the pixel array layer 204 includes a repeat unit U1, a repeat unit U2 and a repeat unit U3. For clarity of illustration, only one repeat unit U1, one repeat unit U2 and one repeat unit U3 and structures corresponding to the one repeat unit U1, the one repeat unit U2 and the one repeat unit U3 are shown in FIG. 6, but those of ordinary skill in the art should understand that in fact, the pixel array layer 204 may include a plurality of repeat units U1, a plurality of repeat units U2 and a plurality of repeat units U3. In addition, in the present embodiment, the repeat unit U1, the repeat unit U2 and the repeat unit U3 are sequentially arranged along the extending direction of one of the data lines DL2, but the present invention is not limited thereto.

In the present embodiment, each of the repeat unit U1, the repeat unit U2 and the repeat unit U3 may include a first pixel unit Ua, a second pixel unit Ub and a third pixel unit Uc. In detail, in the present embodiment, the arrangement of the first pixel unit Ua, the second pixel unit Ub and the third pixel unit Uc in the repeat unit U1, the arrangement of the first pixel unit Ua, the second pixel unit Ub and the third pixel unit Uc in the repeat unit U2 and the arrangement of the first pixel unit Ua, the second pixel unit Ub and the third pixel unit Uc in the repeat unit U3 are different from each other. That is, in the display device 20, the difference between the repeat unit U1, the repeat unit U2 and the repeat unit U3 lies only in the arrangement of the first pixel unit Ua, the second pixel unit Ub and the third pixel unit Uc. As shown in FIG. 6, in the repeat unit U1, the first pixel unit Ua, the second pixel unit Ub and the third pixel unit Uc are sequentially arranged along the extending direction of one of the scan lines SL2; in the repeat unit U2, the second pixel unit Ub, the third pixel unit Uc and the first pixel unit Ua are sequentially arranged along the extending direction of one of the scan lines SL2; and in the repeat unit U3, the third pixel unit Uc, the first pixel unit Ua and the second pixel unit Ub are sequentially arranged along the extending direction of one of the scan lines SL2.

In the present embodiment, in each of the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In other words, the overlapped area between the vertical projection of the first color sub-pixels S1 included in the repeat unit U2 on the substrate 302 and the vertical projection of the light-shielding structure SS on the substrate 302, the overlapped area between the vertical projection of the second color sub-pixels S2 included in the repeat unit U2 on the substrate 302 and the vertical projection of the light-shielding structure SS on the substrate 302, and the overlapped area between the vertical projection of the third color sub-pixels S3 included in the repeat unit U2 on the substrate 302 and the vertical projections of the light-shielding structure SS on the substrate 302 are substantially equal to each other. Similarly, the repeat unit U3 can be analogized accordingly. In this way, under the shielding effect of the black matrix 212 and the light-shielding structure SS, the total aperture ratio of the first color sub-pixels S1 in the display device 20, the total aperture ratio of the second color sub-pixels S2 in the display device 20 and the total aperture ratio of the third color sub-pixels S3 in the display device 20 can be substantially equal to each other.

In the present embodiment, in each of the repeat unit U1, the repeat unit U2 and the repeat unit U3, the sub-pixel overlapped with the data line DL1 of the first pixel unit Ua, the sub-pixel overlapped with the data line DL1 of the second pixel unit Ub and the sub-pixel overlapped with the data line DL1 of the third pixel unit Uc are different from each other. In detail, as shown in FIG. 6, each of the repeat unit U1, the repeat unit U2 and the repeat unit U3 is overlapped with three data lines DL1 and one scan line SL1, wherein in each of the repeat unit U1, the repeat unit U2 and the repeat unit U3, all of the first color sub-pixels S1, the second color sub-pixels S2 and the third color sub-pixels S3 in the first pixel unit Ua, the second pixel unit Ub and the third pixel unit Uc are overlapped with the said scan line SL1; in the first pixel unit Ua, only the first color sub-pixel S1 is overlapped with the data line DL1; in the second pixel unit Ub, only the second color sub-pixel S2 is overlapped with the data line DL1; and in the third pixel unit Uc, only the third color sub-pixel S3 is overlapped with the data line DL1.

In the display device 20, each of the control electrodes DE may overlap eight sub-pixels, for example, two first color sub-pixels S1, three second color sub-pixels S2 and three third color sub-pixels S3. In this way, in this embodiment, the resolution of the dimming panel 300 is lower than the resolution of the display panel 200 to avoid reducing the aperture ratio.

It should be noted that when the resolution of the dimming panel 300 is different from the resolution of the display panel 200, if the total aperture ratio of the first color sub-pixels S1 in the display device 20, the total aperture ratio of the second color sub-pixels S2 in the display device 20 and the total aperture ratio of the third color sub-pixels S3 in the display device 20 are not equal to each other, color moiré effect is likely to occur. In view of this, in the present embodiment, in each of the repeat unit U1, the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, thereby avoiding or reducing color moiré effect. For the rest, please refer to the foregoing embodiments, and details are not described herein.

In addition, as shown in FIG. 2, in the display device 10, in the case that the total area shielded by the light-shielding structure SS of the first color sub-pixels S1 in each repeat unit U1, the total area shielded by the light-shielding structure SS of the second color sub-pixels S2 in each repeat unit U1 and the total area shielded by the light-shielding structure SS of the third color sub-pixels S3 are substantially equal to each other, each of the first pixel unit Ua, the second pixel unit Ub and the third pixel unit Uc includes the first color sub-pixel S1, the second color sub-pixel S2 and the third color sub-pixel S3, but the present invention is not limited thereto. In other embodiments, in the case that the total area shielded by the light-shielding structure SS of the first color sub-pixels S1 in each repeat unit U1, the total area shielded by the light-shielding structure SS of the second color sub-pixels S2 in each repeat unit U1 and the total area shielded by the light-shielding structure SS of the third color sub-pixels S3 are substantially equal to each other, each of the first pixel unit Ua, the second pixel unit Ub and the third pixel unit Uc may further include sub-pixels different from the first color sub-pixel S1, the second color sub-pixel S2 and the third color sub-pixel S3. That is, in the case that the total aperture ratio of the first color sub-pixels S1 in the display device, the total aperture ratio of the second color sub-pixels S2 in the display device and the total aperture ratio of the third color sub-pixels S3 in the display device are substantially equal to each other, the architecture of the display panel may be adjusted according to the actual architecture, requirements, and the like of the display device. Hereinafter, other embodiments will be described with reference to FIG. 7. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 7:
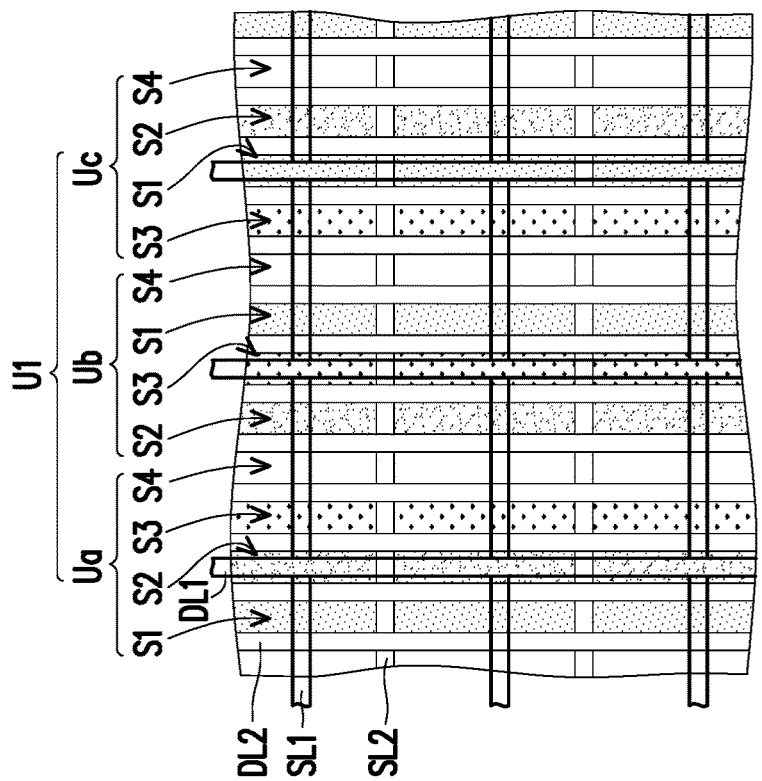
FIG. 7 is a partial schematic top view of a display device in accordance with another embodiment of the present invention.
Figure 8:
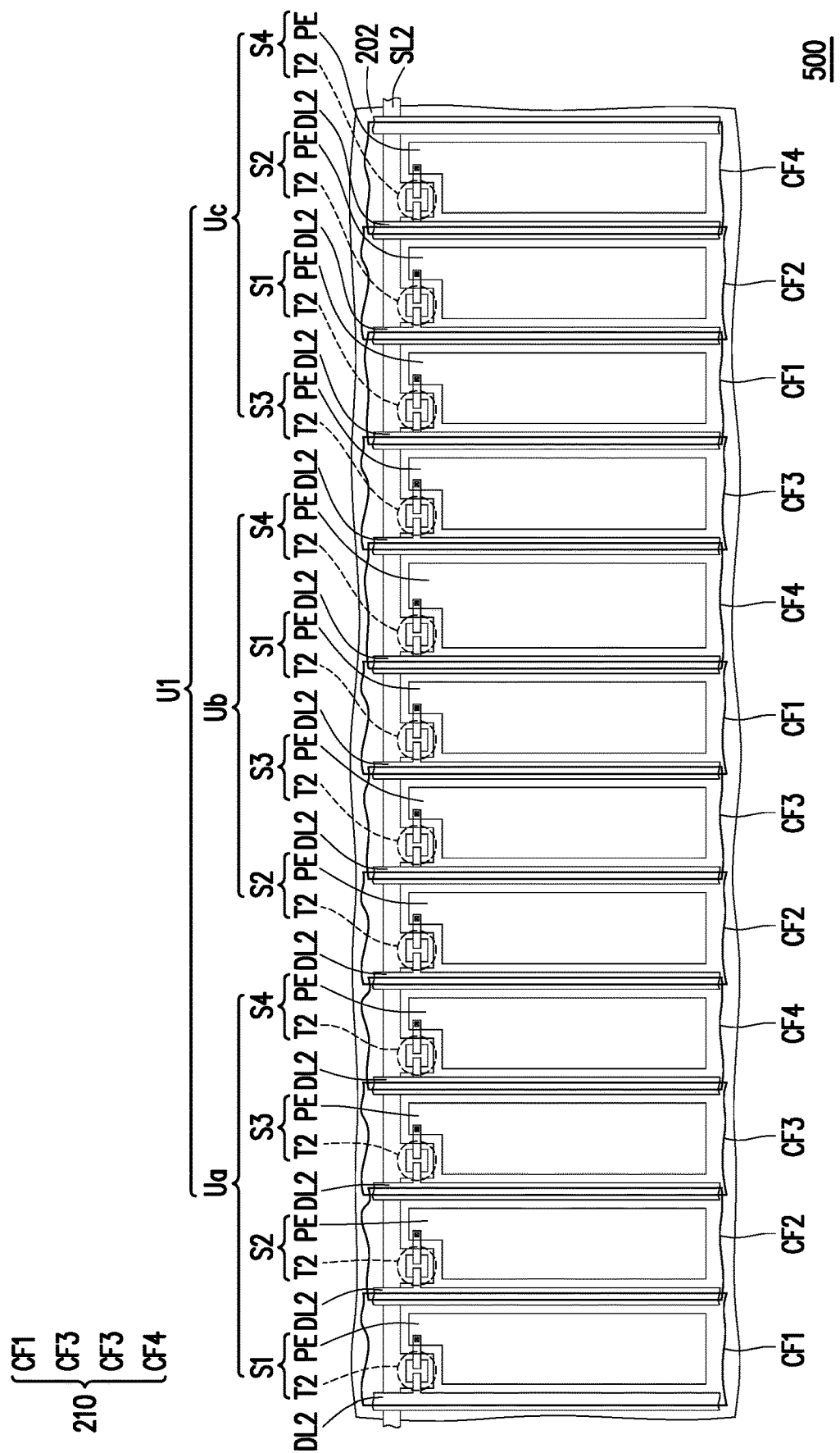
FIG. 8 is a partial schematic top view of a display panel in accordance with another embodiment of the present invention.

FIG. 7 is a partial schematic top view of a display device in accordance with another embodiment of the present invention. FIG. 8 is a partial schematic top view of a display panel in accordance with another embodiment of the present invention. Referring to FIG. 7 and FIG. 2, the display device 30 of FIG. 7 is similar to the display device 10 of FIG. 2, and therefore identical or similar elements are denoted by identical or similar reference numerals, and the description of the same technical contents is omitted. The omitted part of the description can refer to the foregoing embodiments. Hereinafter, the difference between the display device 30 of FIG. 7 and the display device 10 of FIG. 2 will be described. It should be noted that although many film layers and components, such as the liquid crystal layer 206, the common electrode layer 208, the substrate 302, the black matrix 212, the control electrodes DE, are not illustrated in FIG. 7 and FIG. 8, according to the foregoing description of the display device 10 based on FIGS. 1 to 4, the overall structure or layout of the display device 30 should be understood by those of ordinary skill in the art.

Referring to FIG. 7 and FIG. 8, in the display panel 500, each of the first pixel unit Ua, the second pixel unit Ub and the third pixel unit Uc may include a first color sub-pixel S1, a second color sub-pixel S2, a third color sub-pixel S3 and a fourth color sub-pixel S4. In this embodiment, each fourth color sub-pixel S4 is electrically connected to one of the scan lines SL2 and one of the data lines DL2. In this embodiment, each fourth color sub-pixel S4 includes an active element T2 and a pixel electrode PE electrically connected to the active element T2.

In the present embodiment, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub and the arrangement of the first color sub-pixel S1, the second color sub-pixel S2, the third color sub-pixel S3 and the fourth color sub-pixel S4 in the third pixel unit Uc are different from each other. In detail, as shown in FIG. 7 and FIG. 8, in the first pixel unit Ua, the first color sub-pixel S1, the second color sub-pixel S2, the third color sub-pixel S3 and the fourth color sub-pixel S4 are sequentially arranged along the extending direction of one of the scan lines SL2; in the second pixel unit Ub, the second color sub-pixel S2, the third color sub-pixel S3, the first color sub-pixel S1 and the fourth color sub-pixel S4 are sequentially arranged along the extending direction of one of the scan lines SL2; and in the third pixel unit Uc, the third color sub-pixel S3, the first color sub-pixel S1, the second color sub-pixel S2 and the fourth color sub-pixel S4 are sequentially arranged along the extending direction of one of the scan lines SL2. From another point of view, in the present embodiment, the fourth color sub-pixel S4 is disposed at the same position in each of the first pixel unit Ua, the second pixel unit Ub and the third pixel unit Uc.

In this embodiment, the color filter layer 210 may include a plurality of color filter patterns CF1, a plurality of second color filter patterns CF2, a plurality of third color filter patterns CF3 and a plurality of fourth color filter patterns CF4 corresponding to the first color sub-pixels S1, the second color sub-pixels S2, the third color sub-pixels S3 and the fourth color sub-pixels S4, respectively.

As described above, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub, and the arrangement of the first color sub-pixel S1, the second color sub-pixel S2, the third color sub-pixel S3 and the fourth color sub-pixel S4 in the third pixel unit Uc are different from each other, and therefore the arrangement of the first color filter pattern CF1, the second color filter pattern CF2, the third color filter pattern CF3 and fourth color filter pattern CF4 corresponding to the first pixel unit Ua, the arrangement of the first color filter pattern CF1, the second color filter pattern CF2, the third color filter pattern CF3 and fourth color filter pattern CF4 corresponding to the second pixel unit Ub, and the arrangement of the first color filter pattern CF1, the second color filter pattern CF2, the third color filter pattern CF3 and fourth color filter pattern CF4 corresponding to the third pixel unit Uc are also different from each other. As shown in FIG. 8, corresponding to the first pixel unit Ua, the first color filter pattern CF1, the second color filter pattern CF2, the third color filter pattern CF3 and the fourth color filter pattern CF4 are sequentially arranged along the extending direction of one of the scan lines SL2; corresponding to the second pixel unit Ub, the second color filter pattern CF2, the third color filter pattern CF3, the first color filter pattern CF1 and the fourth color filter pattern CF4 are sequentially arranged along the extending direction of one of the scan lines SL2; corresponding to the third pixel unit Uc, the third color filter pattern CF3, the first color filter pattern CF1, the second color filter pattern CF2 and the fourth color filter pattern CF4 are sequentially arranged along the extending direction of one of the scan lines SL2.

In addition, in the present embodiment, the fourth color sub-pixel S4 is a white sub-pixel, that is, the fourth color filter pattern CF4 is white, but the present invention is not limited thereto. In detail, when the liquid crystal molecules in the liquid crystal layer 206 are driven by the potential difference between the pixel electrode PE of the first color sub-pixel S1 and the common electrode layer 208, the potential difference between the pixel electrode PE of the second color sub-pixel S2 and the common electrode layer 208, the potential difference between the pixel electrode PE of the third color sub-pixel S3 and the common electrode layer 208, and the potential difference between the pixel electrode PE of the fourth color sub-pixel S4 and the common electrode layer 208 to allow the light from the backlight module BL to pass through, then red, green, blue, and white light may be shown respectively.

In the present embodiment, in each repeat unit U1, the total area of the first color sub-pixels S1, the total area of the second color sub-pixels S2, the total area of the third color sub-pixels S3 and the total area of the fourth color sub-pixels S4 are substantially equal. As shown in FIG. 7, each repeat unit U1 is overlapped with three data lines DL1 and one scan line SL1, wherein all of the first color sub-pixels S1, the second color sub-pixels S2, the third color sub-pixels S3, and the fourth color sub-pixels S4 in the first pixel unit Ua, the second pixel unit Ub and the third pixel unit Uc are overlapped with the said scan line SL1; only the second color sub-pixel S2 in the first pixel unit Ua is overlapped with the data line DL1; only the third color sub-pixel S3 in the second pixel unit Ub is overlapped with the data line DL1; and only the first color sub-pixel S1 in the third pixel unit Uc is overlapped with the data line DL1. That is, in the present embodiment, in each of the repeat units U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, but are different from the total area shielded by the light-shielding structure SS of the fourth color sub-pixels S4. In this way, under the shielding effect of the black matrix 212 and the light-shielding structure SS, the total aperture ratio of the first color sub-pixels S1 in the display device 30, the total aperture ratio of the second color sub-pixels S2 in the display device 30 and the total aperture ratio of the third color sub-pixels S3 in the display device 30 may be substantially equal to each other, but different from the total aperture ratio of the fourth color sub-pixels S4 in the display device 30.

In the display device 30, each of the control electrodes DE may overlap ten sub-pixels, for example, four second color sub-pixels S2, four third color sub-pixels S3 and two fourth color sub-pixels S4. In this way, in this embodiment, the resolution of the dimming panel 300 is lower than the resolution of the display panel 500 to avoid reducing the aperture ratio.

It should be noted that when the resolution of the dimming panel 300 is different from the resolution of the display panel 500, if the total aperture ratio of the first color sub-pixels S1 in the display device 30, the total aperture ratio of the second color sub-pixels S2 in the display device 30 and the total aperture ratio of the third color sub-pixels S3 in the display device 30 are not equal to each other, color moiré effect is likely to occur. In view of this, in the present embodiment, in each of the repeat units U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, thereby avoiding or reducing color moiré effect.

Further, in the display device 30, although the total aperture ratio of the fourth color sub-pixels S4 is different from the total aperture ratio of the first color sub-pixels S1, the total aperture ratio of the second color sub-pixels S2, and the total aperture ratio of the third color sub-pixels S3, but the fourth color sub-pixel S4 may be a white sub-pixel, thereby not causing color moiré effect. For the rest, please refer to the foregoing embodiments, and details are not described herein.

In addition, as shown in FIG. 7, in the display device 30, the pixel array layer 204 includes only one type of repeat unit U1, but the present invention is not limited thereto. In other embodiments, the pixel array layer 204 may include at least one repeat unit U1 and other repeat units different from the repeat unit U1. That is, in the case that the total aperture ratio of the first color sub-pixels S1 in the display device, the total aperture ratio of the second color sub-pixels S2 in the display device and the total aperture ratio of the third color sub-pixels S3 in the display device are substantially equal to each other, the architecture of the display panel 500 may be adjusted according to the actual architecture, requirements, and the like of the display device. Hereinafter, other embodiments will be described with reference to FIG. 9. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 9:
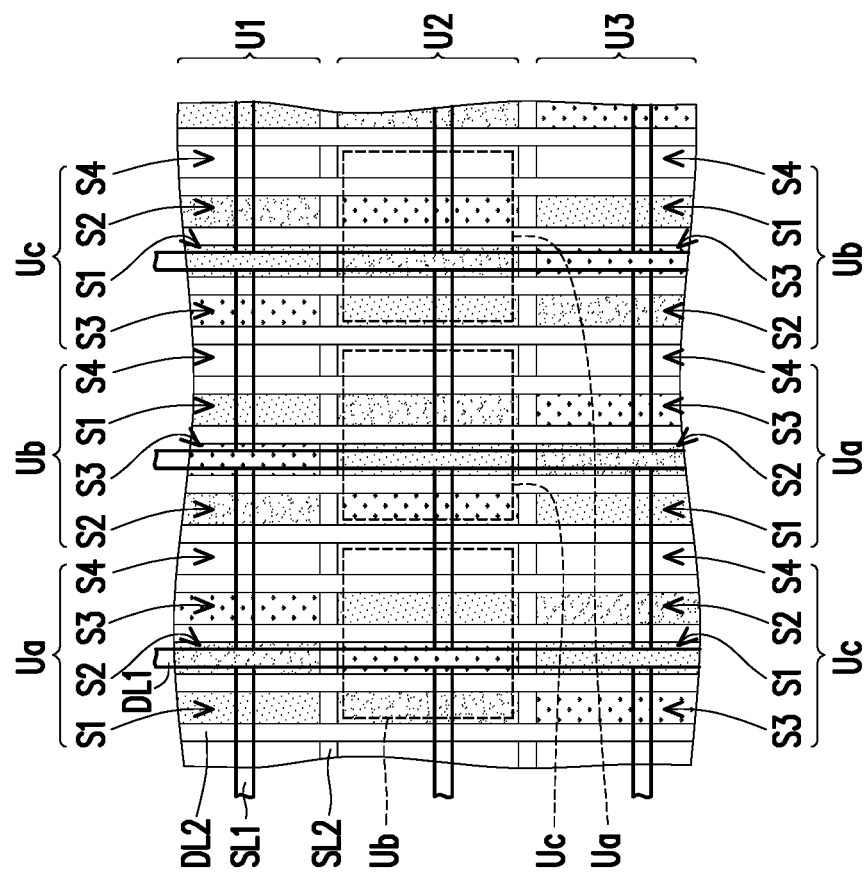
FIG. 9 is a partial schematic top view of a display device in accordance with another embodiment of the present invention.

FIG. 9 is a partial schematic top view of a display device in accordance with another embodiment of the present invention. Referring to FIG. 9 and FIG. 7, the display device 40 of FIG. 9 is similar to the display device 30 of FIG. 7, and therefore identical or similar elements are denoted by identical or similar reference numerals, and the description of the same technical contents is omitted. The omitted part of the description can refer to the foregoing embodiments. Hereinafter, the difference between the display device 40 of FIG. 9 and the display device 30 of FIG. 7 will be described. It should be noted that although many film layers and components, such as the substrate 302, the black matrix 212, the control electrodes DE, are not illustrated in FIG. 9, according to the foregoing description of the display device 10 based on FIGS. 1 to 4, the overall structure or layout of the display device 40 should be understood by those of ordinary skill in the art.

Referring to FIG. 9, in the embodiment, the pixel array layer 204 includes a repeat unit U1, a repeat unit U2 and a repeat unit U3. For clarity of illustration, only one repeat unit U1, one repeat unit U2 and one repeat unit U3 and structures corresponding to the one repeat unit U1, the one repeat unit U2 and the one repeat unit U3 are shown in FIG. 9, but those of ordinary skill in the art should understand that in fact, the pixel array layer 204 may include a plurality of repeat units U1, a plurality of repeat units U2 and a plurality of repeat units U3. In addition, in the present embodiment, the repeat unit U1, the repeat unit U2 and the repeat unit U3 are sequentially arranged along the extending direction of one of the data lines DL2, but the present invention is not limited thereto.

In the present embodiment, each of the repeat unit U1, the repeat unit U2 and the repeat unit U3 may include a first pixel unit Ua, a second pixel unit Ub, and a third pixel unit Uc. In detail, in the present embodiment, the arrangement of the first pixel unit Ua, the second pixel unit Ub and the third pixel unit Uc in the repeat unit U1, and the arrangement of the first pixel unit Ua, the second pixel unit Ub and the third pixel unit Uc in the repeat unit U2 and the arrangement of the first pixel unit Ua, the second pixel unit Ub and the third pixel unit Uc in the repeat unit U3 are different from each other. That is, in the display device 40, the difference between the repeat unit U1, the repeat unit U2 and the repeat unit U3 lies only in the arrangement of the first pixel unit Ua, the second pixel unit Ub and the third pixel unit Uc. As shown in FIG. 9, in the repeat unit U1, the first pixel unit Ua, the second pixel unit Ub and the third pixel unit Uc are sequentially arranged along the extending direction of one of the scan lines SL2; in the repeat unit U2, the second pixel unit Ub, the third pixel unit Uc and the first pixel unit Ua are sequentially arranged along the extending direction of one of the scan lines SL2; and in the repeat unit U3, the third pixel unit Uc, the first pixel unit Ua and the second pixel unit Ub are sequentially arranged along the extending direction of one of the scan lines SL2.

As shown in FIG. 9, in the display device 40, the repeat unit U2 is overlapped with three data lines DL1 and one scan line SL1, wherein all of the first color sub-pixels S1, the second color sub-pixels S2, the third color sub-pixels S3 and the fourth color sub-pixels S4 in the second pixel unit Ub, the third pixel unit Uc and the first pixel unit Ua are overlapped with the said scan line SL1; only the third color sub-pixel S3 in the second pixel unit Ub is overlapped with the data line DL1; only the first color sub-pixel S1 in the third pixel unit Uc is overlapped with the data line DL1; and only the second color sub-pixel S2 in the first pixel unit Ua is overlapped with the data line DLL That is, in the present embodiment, in the repeat unit U2, the total area shielded by the light-shielding structure SS of the first color sub-pixels S1, the total area shielded by the light-shielding structure SS of the second color sub-pixels S2 and the area shielded by the light-shielding structure SS of the third color sub-pixels S3 are substantially equal to each other, but are different from the total area shielded by the light-shielding structure SS of the fourth color sub-pixels S4.

Similarly, as shown in FIG. 9, the repeat unit U3 is overlapped with three data lines DL1 and one scan line SL1, wherein all of the first color sub-pixels S1, the second color sub-pixels S2, the third color sub-pixels S3 and the fourth color sub-pixels S4 in the third pixel unit Uc, the first pixel unit Ua and the second pixel unit Ub are overlapped with the said scan line SL1; only the first color sub-pixel S1 in the third pixel unit Uc is overlapped with the data line DL1; only the second color sub-pixel S2 in the first pixel unit Ua is overlapped with the data line DL1; and only the third color sub-pixel S3 in the second pixel unit Ub is overlapped with the data line DL1. That is, in the present embodiment, in the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, but are different from the total area shielded by the light-shielding structure SS of the fourth color sub-pixels S4. In this way, under the shielding effect of the black matrix 212 and the light-shielding structure SS, the total aperture ratio of the first color sub-pixels S1 in the display device 40, the total aperture ratio of the second color sub-pixels S2 in the display device 40, and the total aperture ratio of the third color sub-pixels S3 in the display device 40 may be substantially equal to each other, but different from the total aperture ratio of the fourth color sub-pixels S4 in the display device 40.

In the display device 40, each of the control electrodes DE may overlap ten sub-pixels, for example, one first color sub-pixel S1, two second color sub-pixels S2, three third color sub-pixels S3, and two fourth color sub-pixels S4. In this way, in this embodiment, the resolution of the dimming panel 300 is lower than the resolution of the display panel 500 to avoid reducing the aperture ratio.

It should be noted that when the resolution of the dimming panel 300 is different from the resolution of the display panel 500, if the total aperture ratio of the first color sub-pixels S1 in the display device 40, the total aperture ratio of the second color sub-pixels S2 in the display device 40 and the total aperture ratio of the third color sub-pixels S3 in the display device 40 are not equal to each other, color moiré effect is likely to occur. In view of this, in the present embodiment, in each of the repeat unit U1, the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, thereby avoiding or reducing color moiré effect. For the rest, please refer to the foregoing embodiments, and details are not described herein.

Further, as shown in FIG. 7, in the display device 30, in the case that the total area shielded by the light-shielding structure SS of the first color sub-pixels S1 in each repeat unit U1, the total area shielded by the light-shielding structure SS of the second color sub-pixels S2 in each repeat unit U1 and the total area shielded by the light-shielding structure SS of the third color sub-pixels S3 in each repeat unit U1 are substantially equal to each other, each repeat unit U1 includes three pixel units, but the present invention is not limited thereto. In other embodiments, in the case that the total area shielded by the light-shielding structure SS of the first color sub-pixels S1 in each repeat unit U1, the total area shielded by the light-shielding structure SS of the second color sub-pixels S2 in each repeat unit U1 and the total area shielded by the light-shielding structure SS of the third color sub-pixels S3 in each repeat unit U1 are substantially equal to each other, each repeat unit U1 may include four pixel units. That is, in the case that the total aperture ratio of the first color sub-pixels S1 in the display device, the total aperture ratio of the second color sub-pixels S2 in the display device, and the total aperture ratio of the third color sub-pixels S3 in the display device are substantially equal to each other, the architecture of the display panel may be adjusted according to the actual architecture, requirements, and the like of the display device. Hereinafter, other embodiments will be described with reference to FIG. 10. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 10:
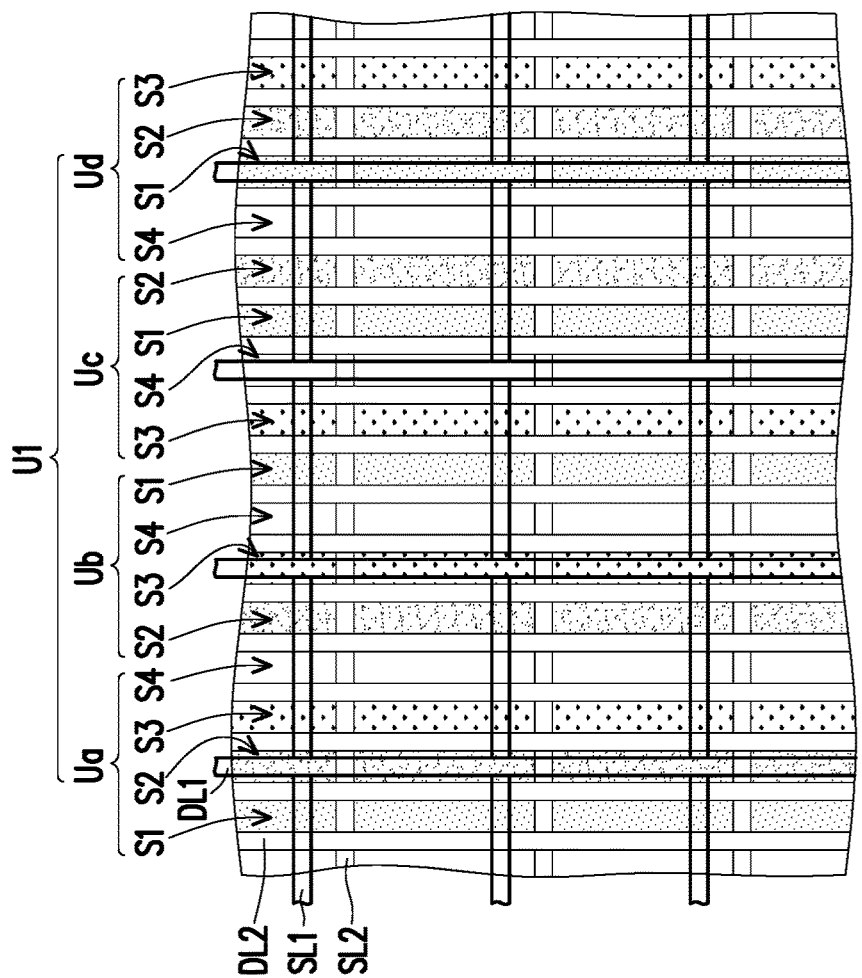
FIG. 10 is a partial schematic top view of a display device in accordance with another embodiment of the present invention.

FIG. 10 is a partial schematic top view of a display device in accordance with another embodiment of the present invention. Referring to FIG. 10 and FIG. 7, the display device 50 of FIG. 10 is similar to the display device 30 of FIG. 7, and therefore identical or similar elements are denoted by identical or similar reference numerals, and the description of the same technical contents is omitted. The omitted part of the description can refer to the foregoing embodiments. Hereinafter, the difference between the display device 50 of FIG. 10 and the display device 30 of FIG. 7 will be described. It should be noted that although many film layers and components, such as the substrate 302, the black matrix 212, the control electrodes DE, are not illustrated in FIG. 10, according to the foregoing description of the display device 10 based on FIGS. 1 to 4, the overall structure or layout of the display device 50 should be understood by those of ordinary skill in the art.

Referring to FIG. 10, in the display panel 600, each repeat unit U1 may include a first pixel unit Ua, a second pixel unit Ub, a third pixel unit Uc and a fourth pixel unit Ud. In each repeat unit U1, the first pixel unit Ua, the second pixel unit Ub, the third pixel unit Uc and the fourth pixel unit Ud are sequentially arranged along the extending direction of one of the scan lines SL2, as shown in FIG. 10. In this embodiment, each of the first pixel unit Ua, the second pixel unit Ub, the third pixel unit Uc and the fourth pixel unit Ud may include a first color sub-pixel S1, a second color sub-pixel S2, a third color sub-pixel S3 and a fourth color sub-pixel S4.

In the present embodiment, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub, the arrangement of the first color sub-pixel S1, the second color sub-pixel S2, the third color sub-pixel S3 and the fourth color sub-pixel S4 in the third pixel element Uc, and the arrangement of the first color sub-pixel S1, the second color sub-pixel S2, the third color sub-pixel S3 and the fourth color sub-pixel S4 in the fourth pixel unit Ud are different from each other. In detail, as shown in FIG. 10, in the first pixel unit Ua, the first color sub-pixel S1, the second color sub-pixel S2, the third color sub-pixel S3 and the fourth color sub-pixel S4 are sequentially arranged along the extending direction of one of the scan lines SL2; in the second pixel unit Ub, the second color sub-pixel S2, the third color sub-pixel S3, the fourth color sub-pixel S4 and the first color sub-pixel S1 are sequentially arranged along the extending direction of one of the scan lines SL2; in the third pixel unit Uc, the third color sub-pixel S3, the fourth color sub-pixel S4, the first color sub-pixel S1 and the second color sub-pixel S2 are sequentially arranged along the extending direction of one of the scan lines SL2; and in the fourth pixel unit Ud, the fourth color sub-pixel S4, the first color sub-pixel S1, the second color sub-pixel S2 and the third color sub-pixel S3 are sequentially arranged along the extending direction of one of the scan lines SL2.

In the present embodiment, in each of the repeat units U1, the total area shielded by the light-shielding structure SS of the first color sub-pixels S1, the total area shielded by the light-shielding structure SS of the second-color sub-pixels S2, the total area shielded by the light-shielding structure SS of the third color sub-pixels S3, and the total area shielded by the light-shielding structure SS of the fourth color sub-pixels S4 are substantially equal to each other. In other words, the overlapped area between the vertical projection of the first color sub-pixels S1 included in each repeat unit U1 on the substrate 302 and the vertical projection of the light-shielding structure SS on the substrate 302, the overlapped area between the vertical projection of the second color sub-pixels S2 included in each repeat unit U1 on the substrate 302 and the vertical projection of the light-shielding structure SS on the substrate 302, the overlapped area between the vertical projection of the third color sub-pixels S3 included in each repeat unit U1 on the substrate 302 and the vertical projection of the light-shielding structure SS on the substrate 302, and the overlapped area between the vertical projection of the fourth color sub-pixels S4 included in each repeat unit U1 on the substrate 302 and the vertical projection of the light-shielding structure SS on the substrate 302 are substantially equal to each other. In this way, under the shielding effect of the black matrix 212 and the light-shielding structure SS, the total aperture ratio of the first color sub-pixels S1 in the display device 50, the total aperture ratio of the second color sub-pixels S2 in the display device 50, the total aperture ratio of the third color sub-pixels S3 in the display device 50 and the total aperture ratio of the fourth color sub-pixels S4 in the display device 50 may be substantially equal to each other.

In detail, as shown in FIG. 10, each repeat unit U1 is overlapped with four data lines DL1 and one scan line SL1, wherein all of the first color sub-pixels S1, the second color sub-pixels S2, the third color sub-pixels S3 and the fourth color sub-pixels S4 in the first pixel unit Ua, the second pixel unit Ub, the third pixel unit Uc and the fourth pixel unit Ud are overlapped with the said scan line SL1; only the second color sub-pixel S2 in the first pixel unit Ua is overlapped with the data line DL1; only the third color sub-pixel S3 in the second pixel unit Ub is overlapped with the data line DL1; only the fourth color sub-pixel S4 in the third pixel unit Uc is overlapped with the data line DL1; and only the first color sub-pixel S1 in the fourth pixel unit Ud is overlapped with the data line DL1. That is, in the present embodiment, in each of the repeat units U1, the sub-pixel overlapped with the data line DL1 of the first pixel unit Ua, the sub-pixel overlapped with the data line DL1 of the second pixel unit Ub, the sub-pixel overlapped with the data line DL1 of the third pixel unit Uc, and the sub-pixel overlapped with the data line DL1 of the fourth pixel unit Ud are different from each other.

Further, in the display device 50, the area of any one of the first color sub-pixels S1, the second color sub-pixels S2, the third color sub-pixels S3 and the fourth color sub-pixels S4 is A, and the area shielded by the light-shielding structure SS of the said any one is B, and A and B satisfy the following relationship: 0%<B/A<about 65%.

In the display device 50, each of the control electrodes DE may overlap ten sub-pixels, for example, four second color sub-pixels S2, four third color sub-pixels S3, and two fourth color sub-pixels S4. In this way, in this embodiment, the resolution of the dimming panel 300 is lower than the resolution of the display panel 600 to avoid reducing the aperture ratio.

It should be noted that when the resolution of the dimming panel 300 is different from the resolution of the display panel 600, if the total aperture ratio of the first color sub-pixels S1 in the display device 50, the total aperture ratio of the second color sub-pixels S2 in display device 50, and the total aperture ratio of the third color sub-pixels S3 in display device 50 are not equal to each other, color moiré effect is likely to occur. In view of this, in the present embodiment, in each of the repeat units U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other, thereby avoiding or reducing color moiré effect. For the rest, please refer to the foregoing embodiments, and details are not described herein.

In addition, as shown in FIG. 10, in the display device 50, the pixel array layer 204 includes only one type of repeat unit U1, but the present invention is not limited thereto. In other embodiments, the pixel array layer 204 may include at least one repeat unit U1 and other repeat units different from the repeat unit U1. That is, in the case that the total aperture ratio of the first color sub-pixels S1 in the display device, the total aperture ratio of the second color sub-pixels S2 in the display device and the total aperture ratio of the third color sub-pixels S3 in the display device are substantially equal to each other, the architecture of the display panel 600 may be adjusted according to the actual architecture, requirements, and the like of the display device. Hereinafter, other embodiments will be described with reference to FIG. 11. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 11:
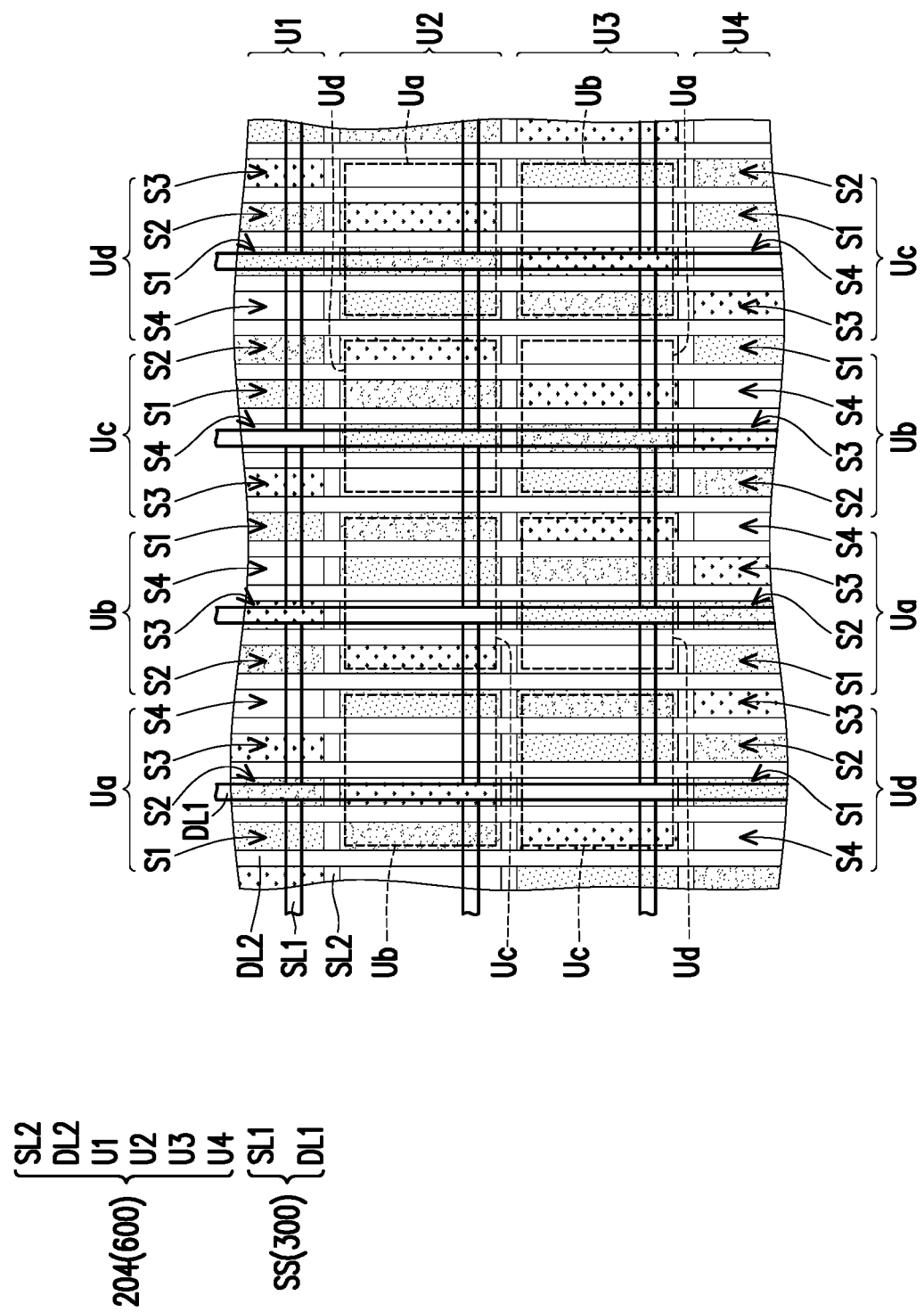
FIG. 11 is a partial schematic top view of a display device in accordance with another embodiment of the present invention.

FIG. 11 is a partial schematic top view of a display device in accordance with another embodiment of the present invention. Referring to FIG. 11 and FIG. 10, the display device 60 of FIG. 11 is similar to the display device 50 of FIG. 10, and therefore identical or similar elements are denoted by identical or similar reference numerals, and the description of the same technical contents is omitted. The omitted part of the description can refer to the foregoing embodiments. Hereinafter, the difference between the display device 60 of FIG. 11 and the display device 50 of FIG. 10 will be described. It should be noted that although many film layers and components, such as the substrate 302, the black matrix 212, the control electrodes DE, are not illustrated in FIG. 11, according to the foregoing description of the display device 10 based on FIGS. 1 to 4, the overall structure or layout of the display device 60 should be understood by those of ordinary skill in the art.

Referring to FIG. 11, in the embodiment, the pixel array layer 204 includes a repeat unit U1, a repeat unit U2, a repeat unit U3 and a repeat unit U4. For the sake of clarity, only one repeat unit U1, one repeat unit U2, one repeat unit U3 and one repeat unit U4 and structures corresponding to the one repeat unit U1, the one repeat unit U2, the one repeat unit U3 and the one repeat unit U4 are shown in FIG. 11, but those of ordinary skill in the art should understand that the pixel array layer 204 may actually include a plurality of repeat units U1, a plurality of repeat units U2, a plurality of repeat units U3 and a plurality of repeat units U4. In addition, in the present embodiment, the repeat unit U1, the repeat unit U2, the repeat unit U3 and the repeat unit U4 are sequentially arranged along the extending direction of one of the data lines DL2, but the present invention is not limited thereto.

In the present embodiment, each of the repeat unit U1, the repeat unit U2, the repeat unit U3 and the repeat unit U4 may include a first pixel unit Ua, a second pixel unit Ub, a third pixel unit Uc and a fourth pixel unit Ud. In detail, in the present embodiment, the arrangement of the first pixel unit Ua, the second pixel unit Ub, the third pixel unit Uc and the fourth pixel unit Ud in the repeat unit U1, the arrangement of the first pixel element Ua, the second pixel unit Ub, the third pixel unit Uc and the fourth pixel unit Ud in the repeat unit U2, the arrangement of the first pixel unit Ua, the second pixel unit Ub, the third pixel unit Uc and the fourth pixel unit Ud in the repeat unit U3, and the arrangement of the first pixel unit Ua, the second pixel unit Ub, the third pixel unit Uc and the fourth pixel unit Ud in the repeat unit U4 are different from each other. That is, in the display device 60, the difference between the repeat unit U1, the repeat unit U2, the repeat unit U3 and the repeat unit U4 lies only in the arrangement of the first pixel unit Ua, the second pixel unit Ub, the third pixel unit Uc and the fourth pixel unit Ud. As shown in FIG. 11, in the repeat unit U1, the first pixel unit Ua, the second pixel unit Ub, the third pixel unit Uc and the fourth pixel unit Ud are sequentially arranged along the extending direction of one of the scan lines SL2; in the repeat unit U2, the second pixel unit Ub, the third pixel unit Uc, the fourth pixel unit Ud and the first pixel unit Ua are sequentially arranged along the extending direction of one of the scan lines SL2; in the repeat unit U3, the third pixel unit Uc, the fourth pixel unit Ud, the first pixel unit Ua and the second pixel unit Ub are sequentially arranged along the extending direction of one of the scan lines SL2; and in the repeat unit U4, the fourth pixel unit Ud, the first pixel unit Ua, the second pixel unit Ub and the third pixel unit Uc are sequentially arranged along the extending direction of one of the scan lines SL2.

In the present embodiment, in each of the repeat unit U2, the repeat unit U3 and the repeat unit U4, the total area shielded by the light-shielding structure SS of the first color sub-pixels S1, the total area shielded by the light-shielding structure SS of the second color sub-pixels S2, the total area shielded by the light-shielding structure SS of the third color sub-pixels S3, and the total area shielded by the light-shielding structure SS of the fourth color sub-pixels S4 are substantially equal. In other words, the overlapped area between the vertical projection of the first color sub-pixels S1 included in the repeat unit U2 on the substrate 302 and the vertical projection of the light-shielding structure SS on the substrate 302, the overlapped area between the vertical projection of the second color sub-pixels S2 included in the repeat unit U2 on the substrate 302 and the vertical projection of the light-shielding structure SS on the substrate 302, the overlapped area between the vertical projection of the third color sub-pixels S3 included in the repeat unit U2 on the substrate 302 and the vertical projection of the light-shielding structure SS on the substrate 302 overlap, and the overlapped area between the vertical projection of the fourth color sub-pixels S4 included in the repeat unit U2 on the substrate 302 and the vertical projection of the light-shielding structure SS on the substrate 302 are substantially equal to each other. Similarly, the repeat unit U3 and the repeat unit U4 can be analogized accordingly. In this way, under the shielding effect of the black matrix 212 and the light-shielding structure SS, the total aperture ratio of the first color sub-pixels S1 in the display device 60, the total aperture ratio of the second color sub-pixels S2 in the display device 60, the total aperture ratio of the third color sub-pixels S3 in the display device 60 and the total aperture ratio of the fourth color sub-pixels S4 in the display device 60 may be substantially equal to each other.

In the present embodiment, in each of the repeat unit U1, the repeat unit U2, the repeat unit U3 and the repeat unit U4, the sub-pixel overlapped with the data line DL1 of the first pixel unit Ua, the sub-pixel overlapped with the data line DL1 of the second pixel unit Ub, the sub-pixel overlapped with the data line DL1 of the third pixel unit Uc and the sub-pixel overlapped with the data line DL1 of the fourth pixel unit Ud are different from each other. In detail, as shown in FIG. 11, each of the repeat unit U1, the repeat unit U2, the repeat unit U3 and the repeat unit U4 is overlapped with four data lines DL1 and one scan line SL1, wherein in each of the repeat unit U1, the repeat unit U2, the repeat unit U3 and the repeat unit U4, all of the first color sub-pixels S1, the second color sub-pixels S2, the third color sub-pixels S3 and the fourth color sub-pixels S4 in the first pixel unit Ua, the second pixel unit Ub, the third pixel unit Uc and the fourth pixel unit Ud are overlapped with the said scan line SL1; in the first pixel unit Ua, only the second color sub-pixel S2 is overlapped with the data line DL1; in the second pixel unit Ub, only the third color sub-pixel S3 is overlapped with the data line DL1; in the third pixel unit Uc, only the fourth color sub-pixel S4 is overlapped with the data line DL1; and in the fourth pixel unit Ud, only the first color sub-pixel S1 is overlapped with the data line DL1.

In the display device 60, each of the control electrodes DE may overlap ten sub-pixels, such as one first color sub-pixel S1, two second color sub-pixels S2, four third-color sub-pixels S3 and three fourth color sub-pixels S4. In this way, in this embodiment, the resolution of the dimming panel 300 is lower than the resolution of the display panel 600 to avoid reducing the aperture ratio.

It should be noted that when the resolution of the dimming panel 300 is different from the resolution of the display panel 600, if the total aperture ratio of the first color sub-pixels S1 in the display device 60, the total aperture ratio of the second color sub-pixels S2 in the display device 60, and the total aperture ratio of the third color sub-pixels S3 in the display device 60 are not equal to each other, color moiré effect is likely to occur. In view of this, in the present embodiment, in each of the repeat unit U1, the repeat unit U2, the repeat unit U3, and the repeat unit U4, the total area shielded by the light-shielding structure SS of the first color sub-pixels S1, the total area shielded by the light-shielding structure SS of the second color sub-pixels S2, and the total area shielded by the light-shielding structure SS of the third-color sub-pixels S3 are substantially equal to each other, thereby avoiding or reducing color moiré effect. For the rest, please refer to the foregoing embodiments, and details are not described herein.

Further, in the display devices 10 to 60, in the case that the total area shielded by the light-shielding structure SS of the first color sub-pixels S1 in each repeat unit U1, the total area shielded by the light-shielding structure SS of the second color sub-pixels S2 in each repeat unit U1 and the total area shielded by the light-shielding structure SS of the third color sub-pixels S3 are substantially equal to each other, the horizontal shortest distance between two adjacent data lines DL1 is approximately equal to the width of one pixel unit, and the horizontal shortest distance between two adjacent scan lines SL1 is approximately equal to the length of one pixel unit, but the present invention is not limited thereto. In other embodiments, in the case that the total area shielded by the light-shielding structure SS of the first color sub-pixels S1 in each repeat unit U1, the total area shielded by the light-shielding structure SS of the second color sub-pixels S2 in each repeat unit U and the total area shielded by the light-shielding structure SS of the third color sub-pixels S3 in each repeat unit U are substantially equal to each other, the horizontal shortest distance between two adjacent data lines DL1 may be greater than the width of one pixel unit, and the horizontal shortest distance between two adjacent scan lines SL1 may be greater than the length of one pixel unit. That is, in the case that the total aperture ratio of the first color sub-pixels S1 in the display device, the total aperture ratio of the second color sub-pixels S2 in the display device and the total aperture ratio of the third color sub-pixels S3 in the display device are substantially equal to each other, the architecture of the dimming panel may be adjusted according to the actual architecture, requirements, and the like of the display device. Hereinafter, other embodiments will be described with reference to FIGS. 12 to 19. It should be noted that the reference numerals and some descriptions in the previous embodiment are used in the following embodiments, in which identical or similar reference numerals indicate identical or similar elements, and repeated description of the same technical contents is omitted. The omitted part of the description can refer to the foregoing embodiment, which is not repeated in the following embodiments.

Figure 12:
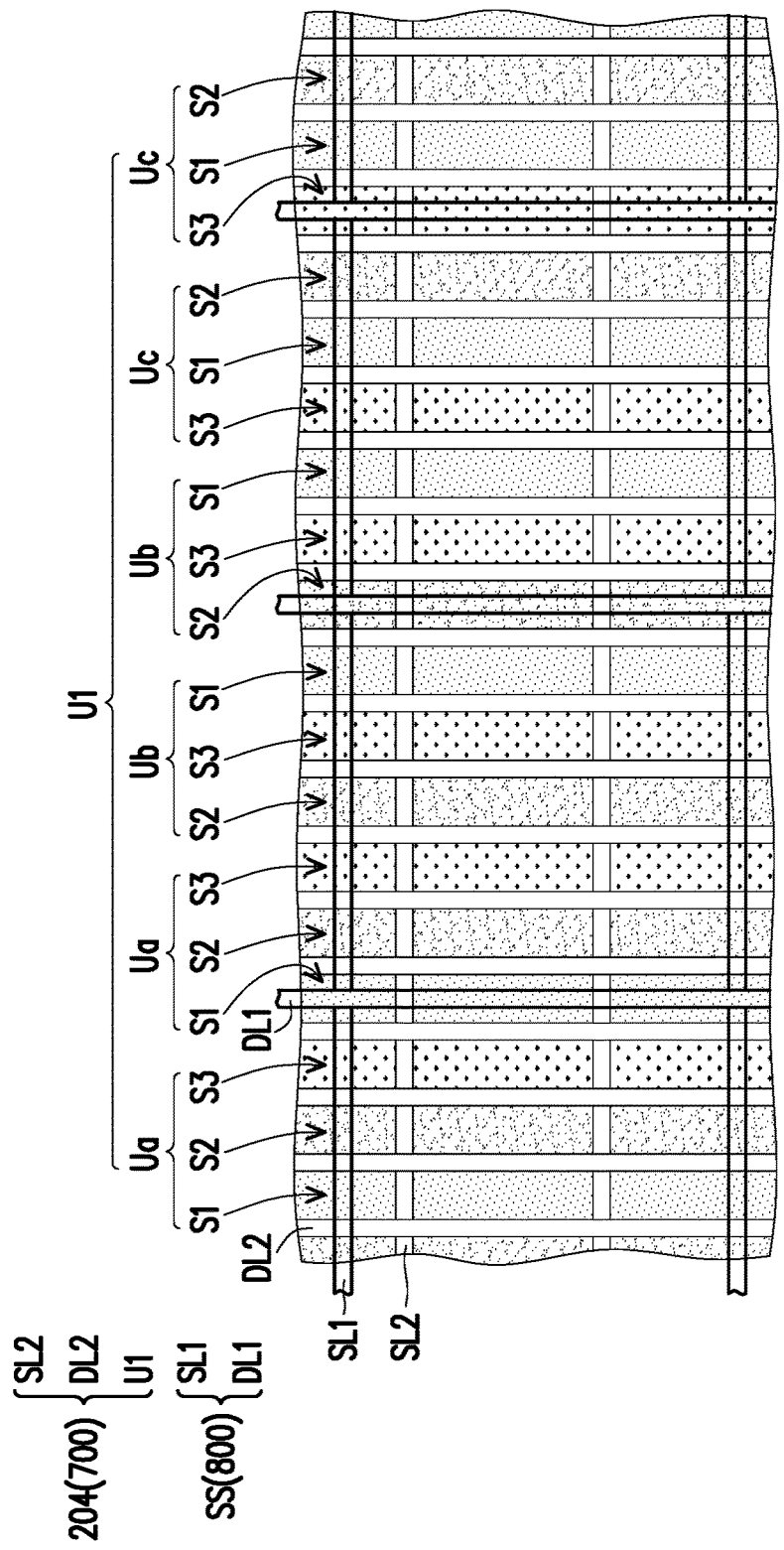
FIG. 12 is a partial schematic top view of a display device in accordance with another embodiment of the present invention.

FIG. 12 is a partial schematic top view of a display device in accordance with another embodiment of the present invention. Referring to FIG. 12 and FIG. 2, the display device 70 of FIG. 12 is similar to the display device 10 of FIG. 2, and therefore identical or similar elements are denoted by identical or similar reference numerals, and the description of the same technical contents is omitted. The omitted part of the description can refer to the foregoing embodiments. Hereinafter, the difference between the display device 70 of FIG. 12 and the display device 10 of FIG. 2 will be described. It should be noted that although many film layers and components, such as the black matrix 212, the control electrodes DE, are not illustrated in FIG. 12, according to the foregoing description of the display device 10 based on FIGS. 1 to 4, the overall structure or layout of the display device 70 should be understood by those of ordinary skill in the art.

Referring to FIG. 12, in the display panel 700, each repeat unit U1 may include two first pixel units Ua, two second pixel units Ub and two third pixel units Uc, wherein the two first pixel units Ua are disposed adjacent to each other, the two second pixel units Ub are disposed adjacent to each other, and the two third pixel units Uc are disposed adjacent to each other. In detail, as shown in FIG. 12, in each repeat unit U1, the first pixel unit Ua, the first pixel unit Ua, the second pixel unit Ub, the second pixel unit Ub, the third pixel unit Uc and the third pixel unit Uc are sequentially arranged along the extending direction of one of the scan lines SL2.

As shown in FIG. 12, in the dimming panel 800, the horizontal shortest distance between two adjacent data lines DL1 is approximately equal to the width of two pixel units (e.g., two first pixel units Ua, two second pixel units Ub or two third pixel units Uc), the horizontal shortest distance between two adjacent scan lines SL1 is approximately equal to the length of two pixel units (e.g., two first pixel units Ua, two second pixel units Ub or two third pixel units Uc), and each of the control electrodes DE corresponds to the area of four pixel units. Moreover, as shown in FIG. 12, in the dimming panel 800, each of the control electrodes DE may overlap twenty one sub-pixels, for example, six first color sub-pixels S1, nine second colors sub-pixels S2 and six third color sub-pixels S3. In this way, in this embodiment, the resolution of the dimming panel 800 is lower than the resolution of the display panel 700 to avoid reducing the aperture ratio.

It should be noted that, in the present embodiment, each of the repeat units U1 includes two first pixel units Ua disposed adjacent to each other, two second pixel units Ub disposed adjacent to each other and two third pixel units Uc disposed adjacent to each other, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub and the arrangement of the first color sub-pixel S1, the second color sub-pixel S2 and the third color sub-pixel S3 in the third pixel unit Uc are different from each other, and the horizontal shortest distance between two adjacent data lines DL1 is approximately equal to the width of two pixel units, such that for the whole display device 70, in each repeat unit U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 70, the total aperture ratio of the second color sub-pixels S2 in the display device 70 and the total aperture ratio of the third color sub-pixels S3 in the display device 70 may be substantially equal to each other, thereby avoiding or reducing color moiré effect. For the rest, please refer to the foregoing embodiments, and details are not described herein.

Figure 13:
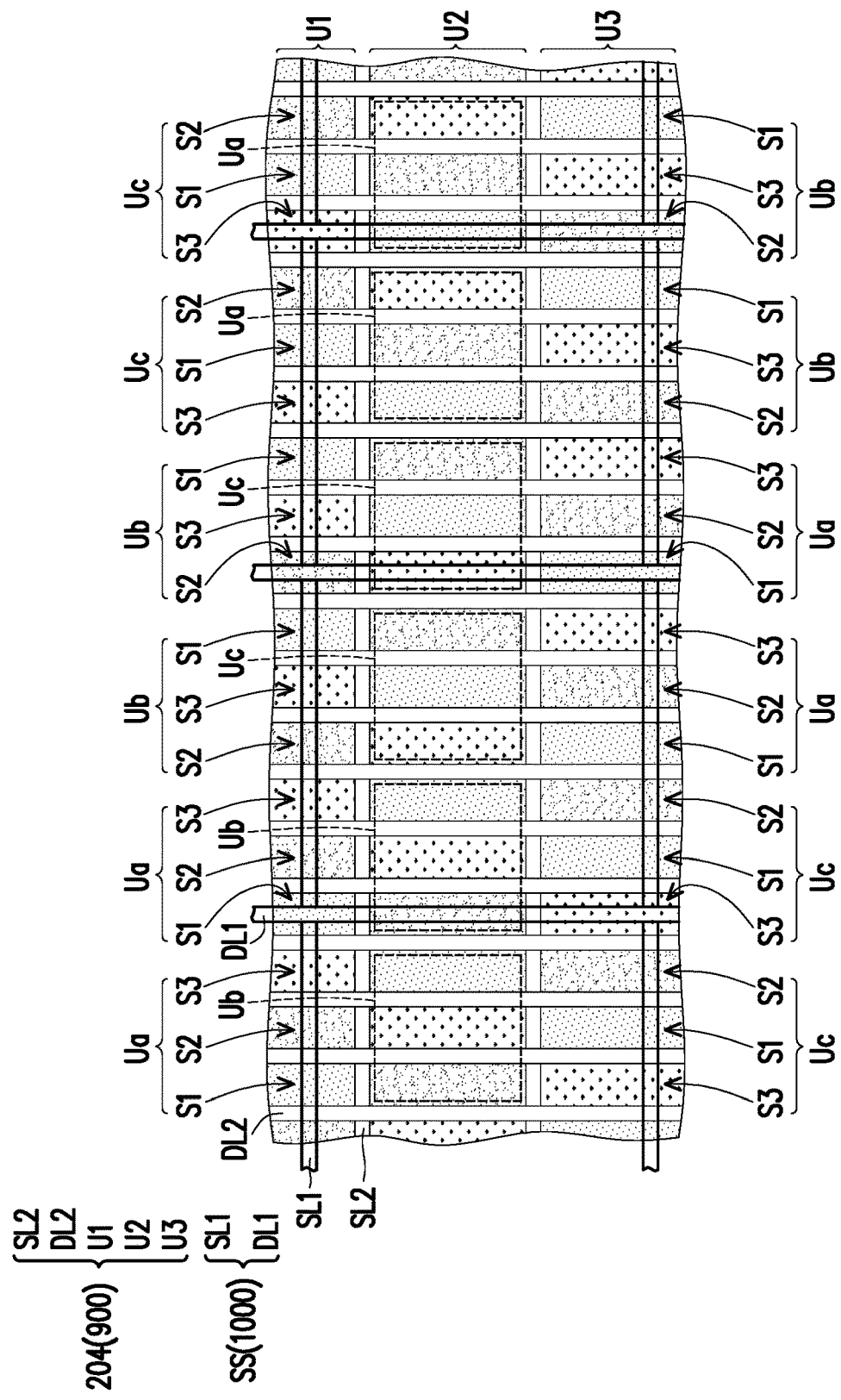
FIG. 13 is a partial schematic top view of a display device in accordance with another embodiment of the present invention.

FIG. 13 is a partial schematic top view of a display device in accordance with another embodiment of the present invention. Referring to FIG. 13 and FIG. 6, the display device 80 of FIG. 13 is similar to the display device 20 of FIG. 6, and therefore identical or similar elements are denoted by identical or similar reference numerals, and the description of the same technical contents is omitted. The omitted part of the description can refer to the foregoing embodiments. Hereinafter, the difference between the display device 80 of FIG. 13 and the display device 20 of FIG. 6 will be described. It should be noted that although many film layers and components, such as the black matrix 212, the control electrodes DE, are not illustrated in FIG. 13, according to the foregoing description of the display device 10 based on FIGS. 1 to 4, the overall structure or layout of the display device 80 should be understood by those of ordinary skill in the art.

Referring to FIG. 13, in the display panel 900, each of the repeat unit U1, the repeat unit U2 and the repeat unit U3 may include two first pixel units Ua, two second pixel units Ub and two third pixel units Uc in which the two first pixel units Ua are disposed adjacent to each other, the two second pixel units Ub are disposed adjacent to each other, and the two third pixel units Uc are adjacent to each other. In detail, as shown in FIG. 13, in the repeat unit U1, the first pixel unit Ua, the first pixel unit Ua, the second pixel unit Ub, the second pixel unit Ub, the third pixel unit Uc and the third pixel unit Uc are sequentially arranged along the extending direction of one of the scan lines SL2; in the repeat unit U2, the second pixel unit Ub, the second pixel unit Ub, the third pixel unit Uc, the third pixel unit Uc, the first pixel unit Ua and the first pixel unit Ua are sequentially arranged along the extending direction of one of the scan lines SL2; and in the repeat unit U3, the third pixel unit Uc, the third pixel unit Uc, the first pixel unit Ua, the first pixel unit Ua, the second pixel unit Ub and the second pixel unit Ub are sequentially arranged along the extending direction of one of the scan lines SL2.

As shown in FIG. 13, in the dimming panel 1000, the horizontal shortest distance between two adjacent data lines DL1 is approximately equal to the width of two pixel units (e.g., two first pixel units Ua, two second pixel units Ub or two third pixel units Uc), the horizontal shortest distance between two adjacent scan lines SL1 is approximately equal to the length of two pixel units, and each of the control electrodes DE corresponds to the area of four pixel units. Moreover, as shown in FIG. 13, in the dimming panel 1000, each of the control electrodes DE may overlap twenty one sub-pixels, for example, seven first color sub-pixels S1, seven second color sub-pixels S2 and seven third color sub-pixels S3. In this way, in this embodiment, the resolution of the dimming panel 1000 is lower than the resolution of the display panel 900 to avoid reducing the aperture ratio.

It should be noted that, in the present embodiment, each of the repeat unit U1, the repeat unit U2 and the repeat unit U3 includes two first pixel units Ua disposed adjacent to each other, two second pixel units Ub disposed adjacent to each other and two third pixel units Uc disposed adjacent to each other, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub and the arrangement of the first color sub-pixel S1, the second color sub-pixel S2 and the third color sub-pixel S3 in the third pixel unit Uc are different from each other, and the horizontal shortest distance between two adjacent data lines DL1 is approximately equal to the width of two pixel units, such that for the whole display device 80, in each of the repeat unit U1, the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 80, the total aperture ratio of the second color sub-pixels S2 in the display device 80 and the total aperture ratio of the third color sub-pixels S3 in the display device 80 may be substantially equal to each other, thereby avoiding or reducing color moiré effect. For the rest, please refer to the foregoing embodiments, and details are not described herein.

Figure 14:
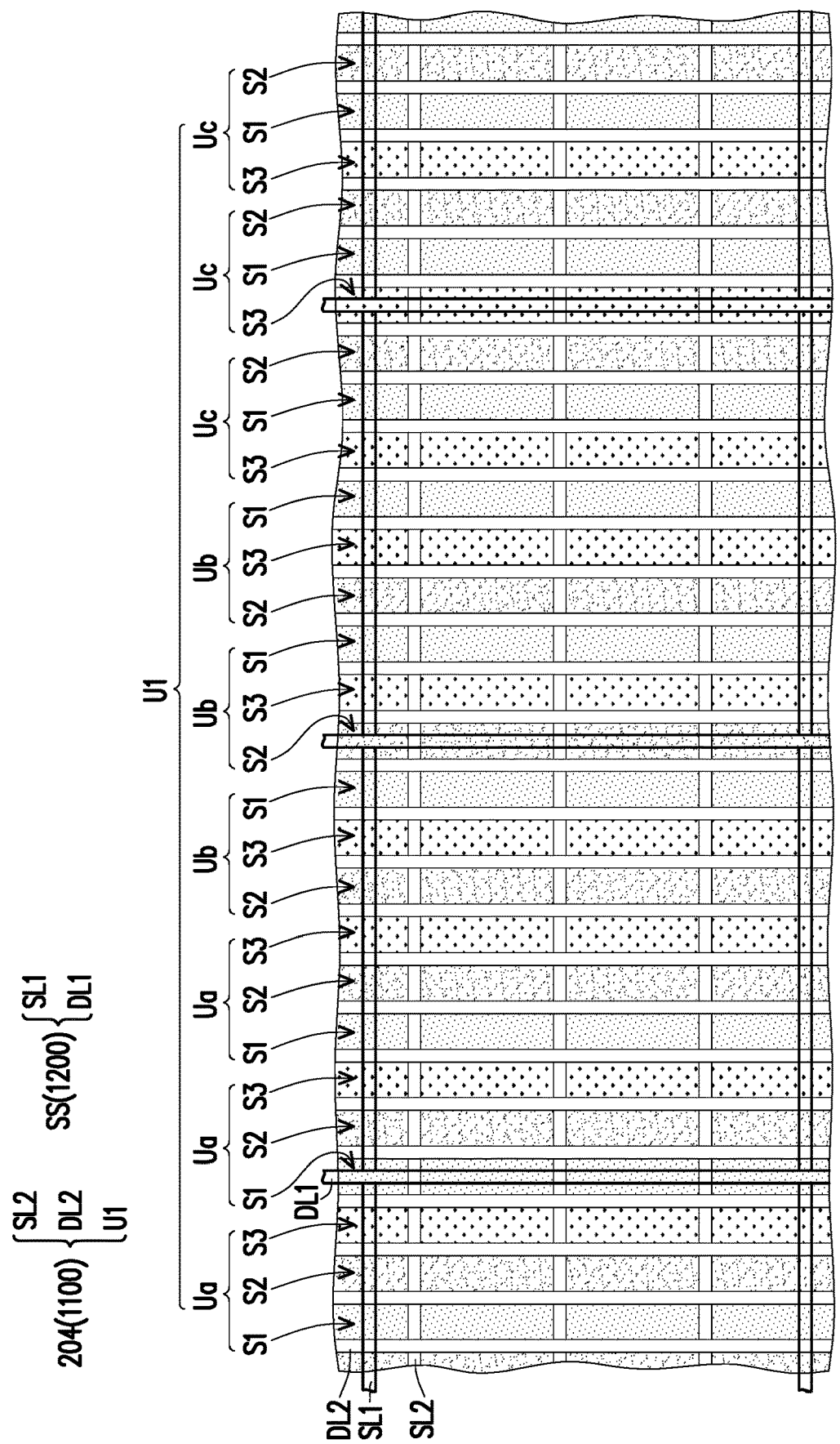
FIG. 14 is a partial schematic top view of a display device in accordance with another embodiment of the present invention.

FIG. 14 is a partial schematic top view of a display device in accordance with another embodiment of the present invention. Referring to FIG. 14 and FIG. 2, the display device 90 of FIG. 14 is similar to the display device 10 of FIG. 2, and therefore identical or similar elements are denoted by identical or similar reference numerals, and the description of the same technical contents is omitted. The omitted part of the description can refer to the foregoing embodiments. Hereinafter, the difference between the display device 90 of FIG. 14 and the display device 10 of FIG. 2 will be described. It should be noted that although many film layers and components, such as the black matrix 212, the control electrodes DE, are not illustrated in FIG. 14, according to the foregoing description of the display device 10 based on FIGS. 1 to 4, the overall structure or layout of the display device 90 should be understood by those of ordinary skill in the art.

Referring to FIG. 14, in the display panel 1100, each repeat unit U1 may include three first pixel units Ua, three second pixel units Ub and three third pixel units Uc, wherein the three first pixel units Ua are disposed adjacent to each other, three second pixel units Ub are disposed adjacent to each other, and three third pixel units Uc are adjacent to each other. In detail, as shown in FIG. 14, in each repeat unit U1, the first pixel unit Ua, the first pixel unit Ua, the first pixel unit Ua, the second pixel unit Ub, the second pixel unit Ub, the second pixel unit Ub, the third pixel unit Uc, the third pixel unit Uc and the third pixel unit Uc are sequentially arranged along the extending direction of one of the scan lines SL2.

As shown in FIG. 14, in the dimming panel 1200, the horizontal shortest distance between two adjacent data lines DL1 is approximately equal to the width of three pixel units (e.g., three first pixel units Ua, three second pixel units Ub or three third pixel units Uc), the horizontal shortest distance between two adjacent scan lines SL1 is approximately equal to the length of three pixel units, and each of the control electrodes DE corresponds to the area of nine pixel units. Moreover, as shown in FIG. 14, in the dimming panel 1200, each of the control electrodes DE may overlap forty sub-pixels, for example, twelve first color sub-pixels S1, sixteen second color sub-pixels S2 and twelve third color sub-pixels S3. In this way, in this embodiment, the resolution of the dimming panel 1200 is lower than the resolution of the display panel 1100 to avoid reducing the aperture ratio.

It should be noted that, in the present embodiment, each of the repeat units U1 includes three first pixel units Ua disposed adjacent to each other, three second pixel units Ub disposed adjacent to each other and three third pixel units Uc disposed adjacent to each other, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub and the arrangement of the first color sub-pixel S1, the second color sub-pixel S2 and the third color sub-pixel S3 in the third pixel unit Uc are different from each other, and the horizontal shortest distance between two adjacent data lines DL1 is approximately equal to the width of three pixel units, such that for the whole display device 90, in each repeat unit U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 90, the total aperture ratio of the second color sub-pixels S2 in the display device 90 and the total aperture ratio of the third color sub-pixels S3 in the display device 90 may be substantially equal to each other, thereby avoiding or reducing color moiré effect. For the rest, please refer to the foregoing embodiments, and details are not described herein.

Figure 15:
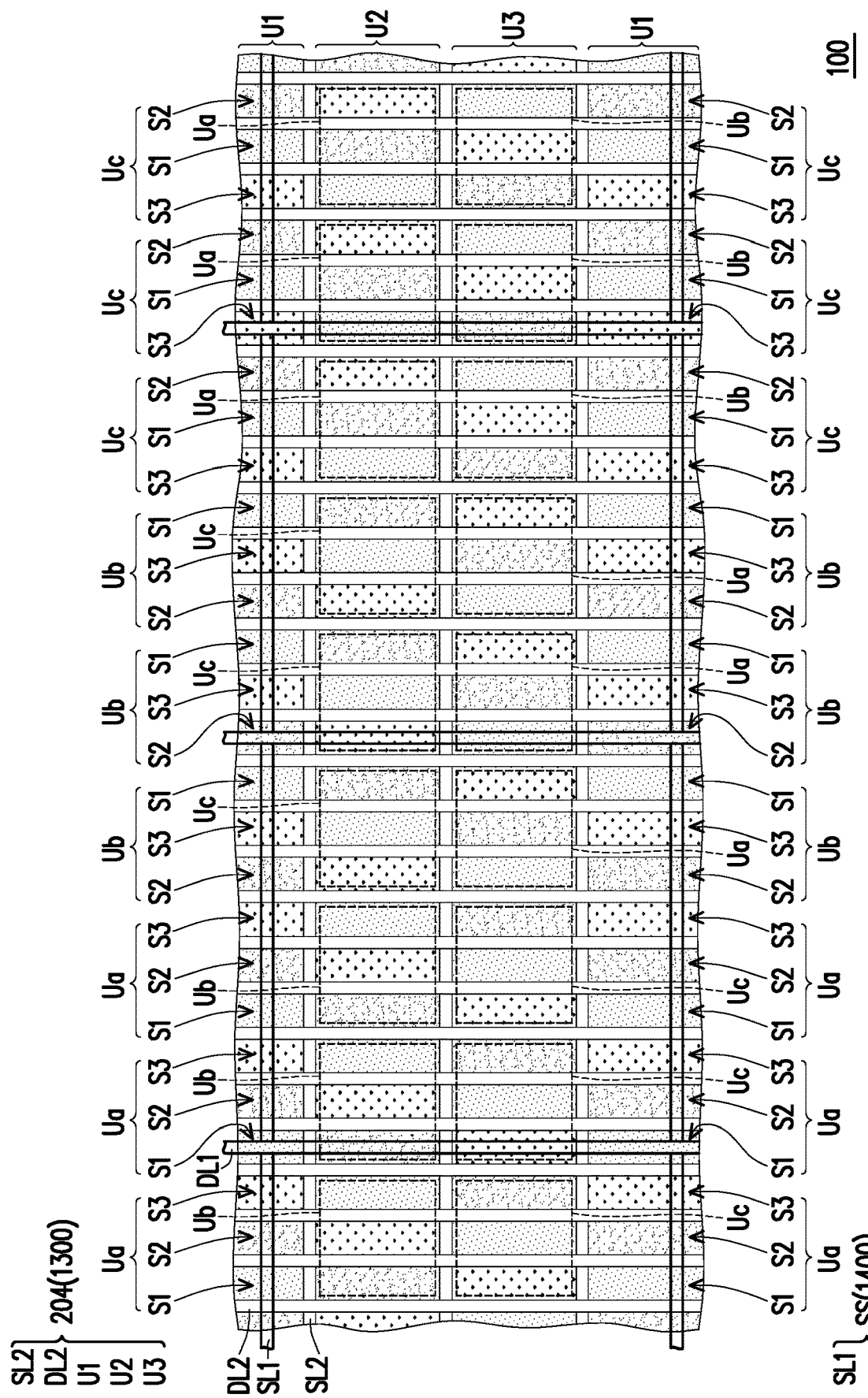
FIG. 15 is a partial schematic top view of a display device in accordance with another embodiment of the present invention.

FIG. 15 is a partial schematic top view of a display device in accordance with another embodiment of the present invention. Referring to FIG. 15 and FIG. 6, the display device 100 of FIG. 15 is similar to the display device 20 of FIG. 6, and therefore identical or similar elements are denoted by identical or similar reference numerals, and the description of the same technical contents is omitted. The omitted part of the description can refer to the foregoing embodiments. Hereinafter, the difference between the display device 100 of FIG. 15 and the display device 20 of FIG. 6 will be described. It should be noted that although many film layers and components, such as the black matrix 212, the control electrodes DE, are not illustrated in FIG. 15, according to the foregoing description of the display device 10 based on FIGS. 1 to 4, the overall structure or layout of the display device 100 should be understood by those of ordinary skill in the art.

Referring to FIG. 15, in the display panel 1300, each of the repeat unit U1, the repeat unit U2 and the repeat unit U3 may include three first pixel units Ua, three second pixel units Ub and three third pixel units Uc in which the three first pixel units Ua are disposed adjacent to each other, the three second pixel units Ub are disposed adjacent to each other, and the three third pixel units Uc are adjacent to each other. In detail, as shown in FIG. 15, in the repeat unit U1, the first pixel unit Ua, the first pixel unit Ua, the first pixel unit Ua, the second pixel unit Ub, the second pixel unit Ub, the second pixel unit Ub, the third pixel unit Uc, the third pixel unit Uc and the third pixel unit Uc are sequentially arranged along the extending direction of one of the scan lines SL2; in the repeat unit U2, the second pixel unit Ub, the second pixel unit Ub, the second pixel unit Ub, the third pixel unit Uc, the third pixel unit Uc, the third pixel unit Uc, the first pixel unit Ua, the first pixel unit Ua and the first pixel unit Ua are sequentially arranged along the extending direction of one of the scan lines SL2; and in the repeat unit U3, the third pixel unit Uc, the third pixel unit Uc, the third pixel unit Uc, the first pixel unit Ua, the first pixel unit Ua, the first pixel unit Ua, the second pixel unit Ub, the second pixel unit Ub and the second pixel unit Ub are sequentially arranged along the extending direction of one of the scan lines SL2.

In addition, only two repeat units U1, one repeat unit U2 and one repeat unit U3 and structures corresponding to the two repeat units U1, the one repeat unit U2 and the one repeat unit U3 are illustrated in FIG. 15, but those of ordinary skill in the art should understand that the pixel array layer 204 may actually include a plurality of repeat units U1, a plurality of repeat units U2 and a plurality of repeat units U3. Further, in the present embodiment, the repeat unit U1, the repeat unit U2, the repeat unit U3 and the repeat unit U1 are sequentially arranged along the extending direction of one of the data lines DL2, but the present invention is not limited thereto.

As shown in FIG. 15, in the dimming panel 1400, the horizontal shortest distance between two adjacent data lines DL1 is approximately equal to the width of three pixel units (e.g., three first pixel units Ua, three second pixel units Ub or three third pixel units Uc), the horizontal shortest distance between two adjacent scan lines SL1 is approximately equal to the length of three pixel units, and each of the control electrodes DE corresponds to the area of nine pixel units. Moreover, as shown in FIG. 15, in the dimming panel 1400, each of the control electrodes DE may overlap forty sub-pixels, for example, thirteen first color sub-pixels S1, fourteen second color sub-pixels S2 and thirteen third color sub-pixels S3. In this way, in this embodiment, the resolution of the dimming panel 1400 is lower than the resolution of the display panel 1300 to avoid reducing the aperture ratio.

It should be noted that, in the present embodiment, each of the repeat unit U1, the repeat unit U2 and the repeat unit U3 includes three first pixel units Ua disposed adjacent to each other, three second pixel units Ub disposed adjacent to each other and three third pixel units Uc disposed adjacent to each other, the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub and the arrangement of the first color sub-pixel S1, the second color sub-pixel S2 and the third color sub-pixel S3 in the third pixel unit Uc are different from each other, and the horizontal shortest distance between two adjacent data lines DL1 is approximately equal to the width of three pixel units, such that for the whole display device 100, in each of the repeat unit U1, the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 100, the total aperture ratio of the second color sub-pixels S2 in the display device 100, and the total aperture ratio of the third color sub-pixels S3 in the display device 100 may be substantially equal to each other, thereby avoiding or reducing color moiré effect. For the rest, please refer to the foregoing embodiments, and details are not described herein.

Figure 16:
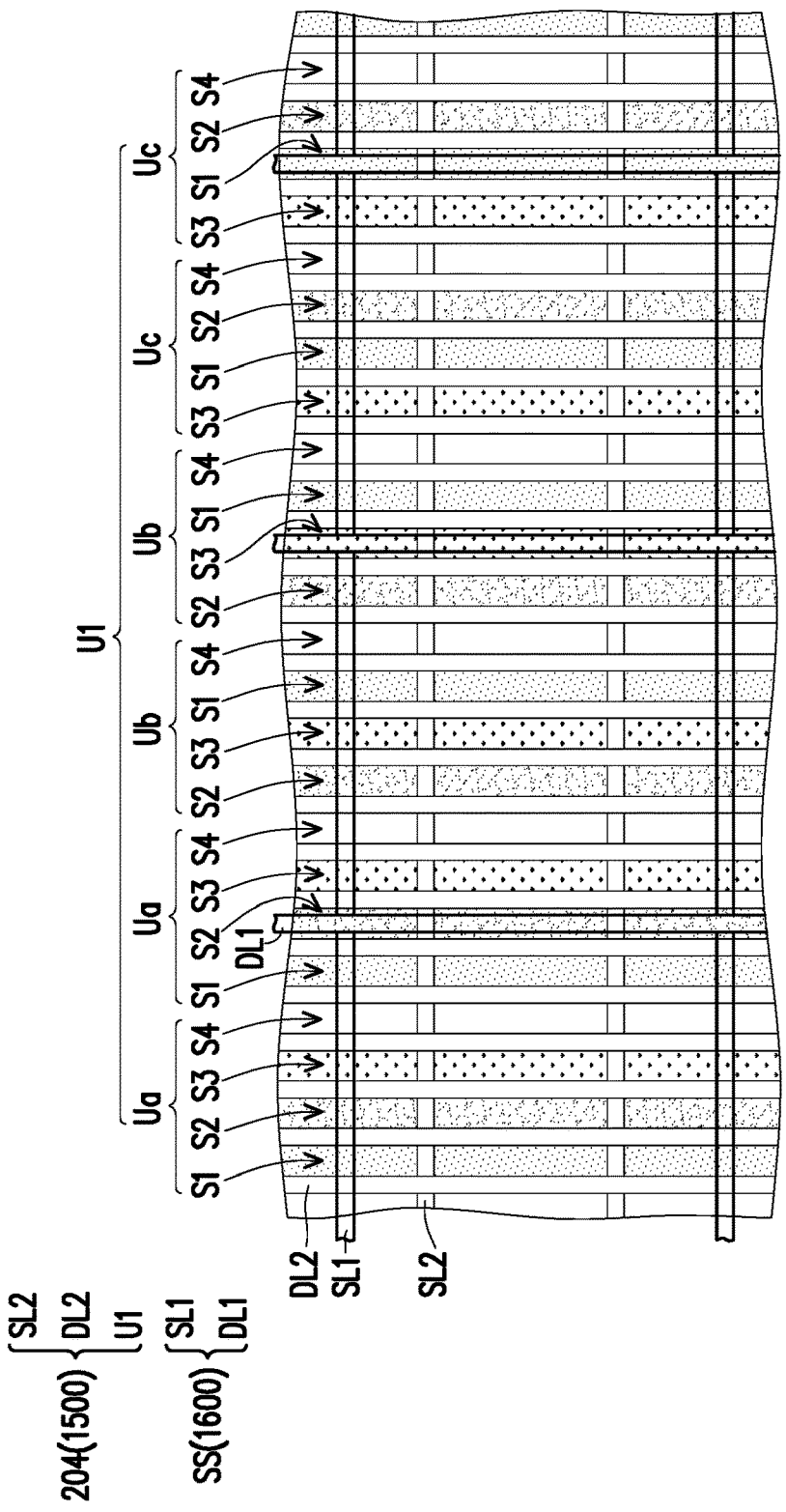
FIG. 16 is a partial schematic top view of a display device in accordance with another embodiment of the present invention.

FIG. 16 is a partial schematic top view of a display device in accordance with another embodiment of the present invention. Referring to FIG. 16 and FIG. 7, the display device 110 of FIG. 16 is similar to the display device 30 of FIG. 7, and therefore identical or similar elements are denoted by identical or similar reference numerals, and the description of the same technical contents is omitted. The omitted part of the description can refer to the foregoing embodiments. Hereinafter, the difference between the display device 110 of FIG. 16 and the display device 30 of FIG. 7 will be described. It should be noted that although many film layers and components, such as the black matrix 212, the control electrodes DE, are not illustrated in FIG. 16, according to the foregoing description of the display device 10 based on FIGS. 1 to 4, the overall structure or layout of the display device 110 should be understood by those of ordinary skill in the art.

Referring to FIG. 16, in the display panel 1500, each repeat unit U1 may include two first pixel units Ua, two second pixel units Ub and two third pixel units Uc, wherein the two first pixel units Ua are disposed adjacent to each other, the two second pixel units Ub are disposed adjacent to each other, and the two third pixel units Uc are disposed adjacent to each other. In detail, as shown in FIG. 16, in each repeat unit U1, the first pixel unit Ua, the first pixel unit Ua, the second pixel unit Ub, the second pixel unit Ub, the third pixel unit Uc and the third pixel unit Uc are sequentially arranged along the extending direction of one of the scan lines SL2.

As shown in FIG. 16, in the dimming panel 1600, the horizontal shortest distance between two adjacent data lines DL1 is approximately equal to the width of two pixel units (e.g., two first pixel units Ua, two second pixel units Ub or two third pixel units Uc), the horizontal shortest distance between two adjacent scan lines SL1 is approximately equal to the length of two pixel units, and each of the control electrodes DE corresponds to the area of four pixel units. Moreover, as shown in FIG. 16, in the dimming panel 1600, each of the control electrodes DE may overlap twenty-seven sub-pixels, for example, three first color sub-pixels S1, nine second color sub-pixels S2, nine third color sub-pixels S3 and six fourth color sub-pixels S4. In this way, in this embodiment, the resolution of the dimming panel 1600 is lower than the resolution of the display panel 1500 to avoid reducing the aperture ratio.

It should be noted that, in the present embodiment, each of the repeat units U1 includes two first pixel units Ua disposed adjacent to each other, two second pixel units Ub disposed adjacent to each other and two third pixel units Uc disposed adjacent to each other, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub and the arrangement of the first color sub-pixel S1, the second color sub-pixel S2, the third color sub-pixel S3 and the fourth color sub-pixel S4 in the third pixel unit Uc are different from each other, and the horizontal shortest distance between two adjacent data lines DL1 is approximately equal to the width of two pixel units, such that for the whole display device 110, in each repeat unit U1, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 110, the total aperture ratio of the second color sub-pixels S2 in the display device 110 and the total aperture ratio of the third color sub-pixels S3 in the display device 110 may be substantially equal to each other, thereby avoiding or reducing color moiré effect. For the rest, please refer to the foregoing embodiments, and details are not described herein.

Figure 17:
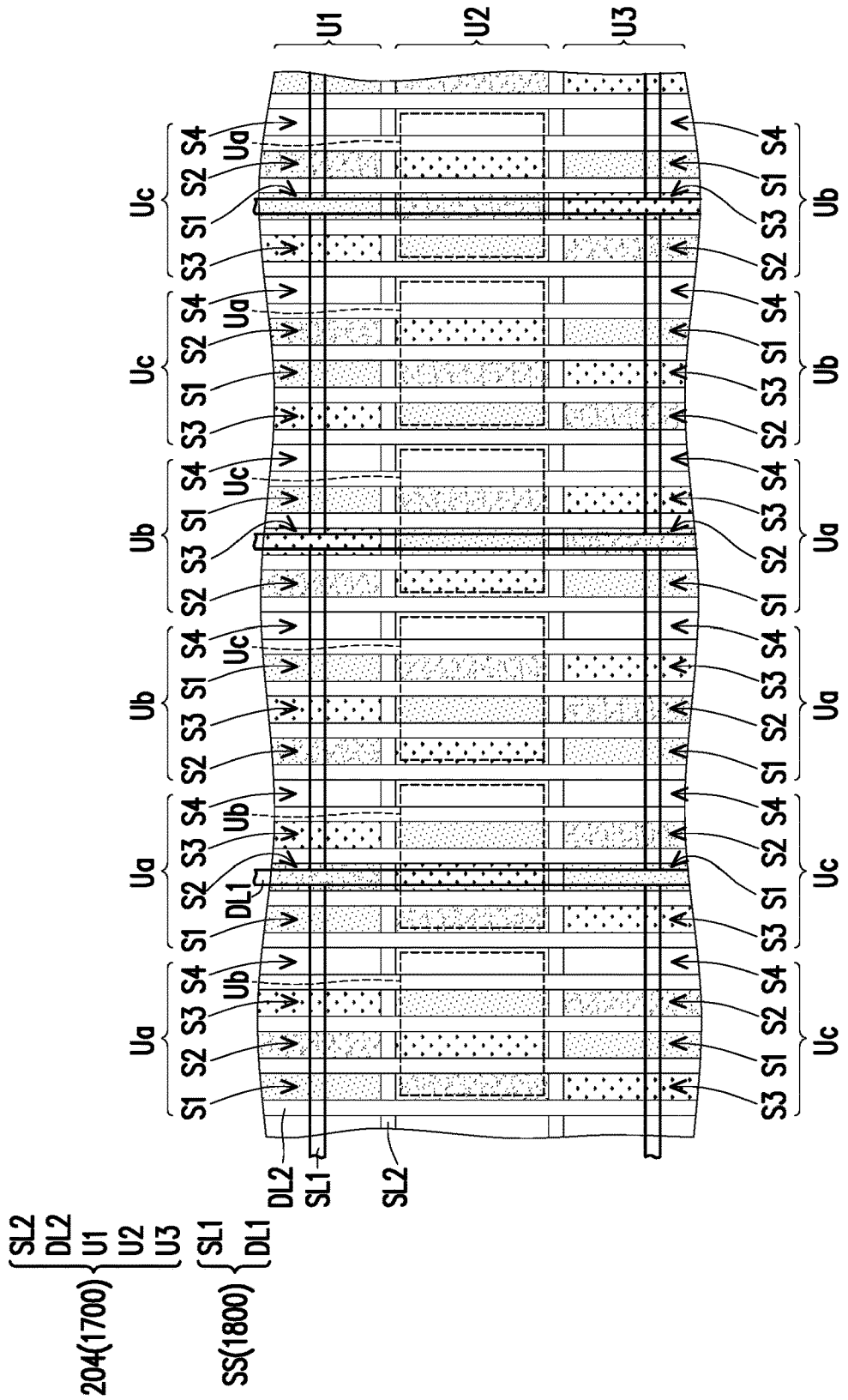
FIG. 17 is a partial schematic top view of a display device in accordance with another embodiment of the present invention.

FIG. 17 is a partial schematic top view of a display device in accordance with another embodiment of the present invention. Referring to FIG. 17 and FIG. 9, the display device 120 of FIG. 17 is similar to the display device 40 of FIG. 9, and therefore identical or similar elements are denoted by identical or similar reference numerals, and the description of the same technical contents is omitted. The omitted part of the description can refer to the foregoing embodiments. Hereinafter, the difference between the display device 120 of FIG. 17 and the display device 40 of FIG. 9 will be described. It should be noted that although many film layers and components, such as the black matrix 212, the control electrodes DE, are not illustrated in FIG. 17, according to the foregoing description of the display device 10 based on FIGS. 1 to 4, the overall structure or layout of the display device 120 should be understood by those of ordinary skill in the art.

Referring to FIG. 17, in the display panel 1700, each of the repeat unit U1, the repeat unit U2 and the repeat unit U3 may include two first pixel units Ua, two second pixel units Ub and two third pixel units Uc in which the two first pixel units Ua are disposed adjacent to each other, the two second pixel units Ub are disposed adjacent to each other, and the two third pixel units Uc are disposed adjacent to each other. In detail, as shown in FIG. 17, in the repeat unit U1, the first pixel unit Ua, the first pixel unit Ua, the second pixel unit Ub, the second pixel unit Ub, the third pixel unit Uc and the third pixel unit Uc are sequentially arranged along the extending direction of one of the scan lines SL2; in the repeat unit U2, the second pixel unit Ub, the second pixel unit Ub, the third pixel unit Uc, the third pixel unit Uc, the first pixel unit Ua and the first pixel unit Ua are sequentially arranged along the extending direction of one of the scan lines SL2; and in the repeat unit U3, the third pixel unit Uc, the third pixel unit Uc, the first pixel unit Ua, the first pixel unit Ua, the second pixel unit Ub and the second pixel unit Ub are sequentially arranged along the extending direction of one of the scan lines SL2.

As shown in FIG. 17, in the dimming panel 1800, the horizontal shortest distance between two adjacent data lines DL1 is approximately equal to the width of two pixel units (e.g., two first pixel units Ua, two second pixel units Ub or two third pixel units Uc), the horizontal shortest distance between two adjacent scan lines SL1 is approximately equal to the length of two pixel units, and each of the control electrodes DE corresponds to the area of four pixel units. Moreover, as shown in FIG. 17, in the dimming panel 1800, each of the control electrodes DE may overlap twenty-seven sub-pixels, for example, seven first color sub-pixels S1, seven second color sub-pixels S2, seven third color sub-pixels S3 and six fourth color sub-pixels S4. In this way, in this embodiment, the resolution of the dimming panel 1800 is lower than the resolution of the display panel 1700 to avoid reducing the aperture ratio.

It should be noted that, in the present embodiment, each of the repeat unit U1, the repeat unit U2 and the repeat unit U3 includes two first pixel units Ua disposed adjacent to each other, two second pixel units Ub disposed adjacent to each other and two third pixel units Uc disposed adjacent to each other, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub and the arrangement of the first color sub-pixel S1, the second color sub-pixel S2, the third color sub-pixel S3 and the fourth color sub-pixel S4 in the third pixel unit Uc are different from each other, and the horizontal shortest distance between two adjacent data lines DL1 is approximately equal to the width of two pixel units, such that for the whole display device 120, in each of the repeat unit U1, the repeat unit U2 and the repeat unit U3, the total area shielded by the light-shielding structure SS of the first color sub-pixels S1, the total area shielded by the light-shielding structure SS of the second color sub-pixels S2 and the total area shielded by the light-shielding structure SS of the third color sub-pixels S3 are substantially equal to each other. In this way, under the shielding effect of the black matrix 212 and the light-shielding structure SS, the total aperture ratio of the first color sub-pixels S1 in the display device 120, the total aperture ratio of the second color sub-pixels S2 in the display device 120, and the total aperture ratio of the third color sub-pixels S3 in the display device 120 may be substantially equal to each other, thereby avoiding or reducing color moiré effect. For the rest, please refer to the foregoing embodiments, and details are not described herein.

Figure 18:
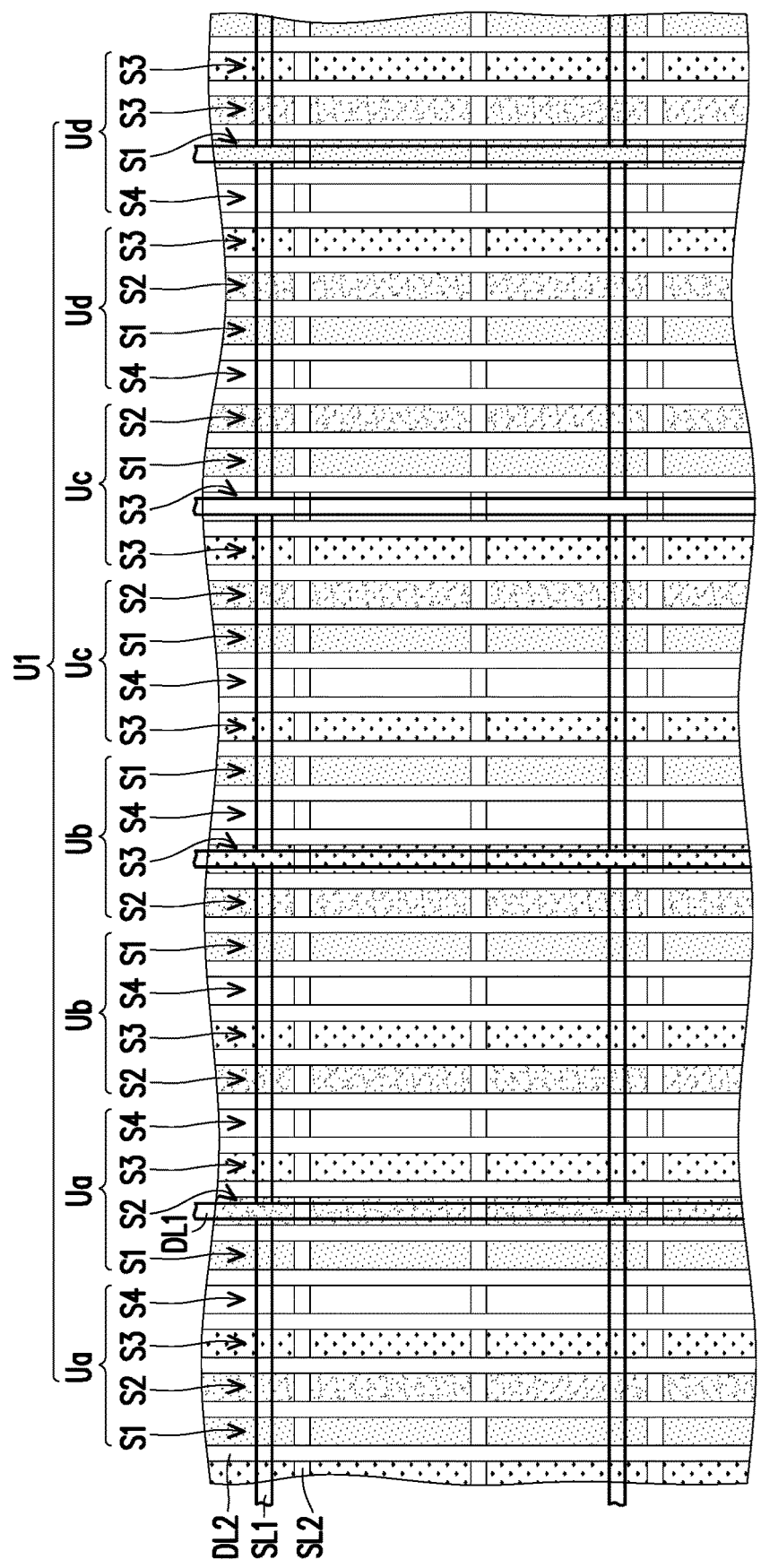
FIG. 18 is a partial schematic top view of a display device in accordance with another embodiment of the present invention.

FIG. 18 is a partial schematic top view of a display device in accordance with another embodiment of the present invention. Referring to FIG. 18 and FIG. 10, the display device 130 of FIG. 18 is similar to the display device 50 of FIG. 10, and therefore identical or similar elements are denoted by identical or similar reference numerals, and the description of the same technical contents is omitted. The omitted part of the description can refer to the foregoing embodiments. Hereinafter, the difference between the display device 130 of FIG. 18 and the display device 50 of FIG. 10 will be described. It should be noted that although many film layers and components, such as the black matrix 212, the control electrodes DE, are not illustrated in FIG. 18, according to the foregoing description of the display device 10 based on FIGS. 1 to 4, the overall structure or layout of the display device 130 should be understood by those of ordinary skill in the art.

Referring to FIG. 18, in the display panel 1900, each repeat unit U1 may include two first pixel units Ua, two second pixel units Ub, two third pixel units Uc and two fourth pixel units Ud in which the two first pixel units Ua are disposed adjacent to each other, the two second pixel units Ub are disposed adjacent to each other, the two third pixel units Uc are disposed adjacent to each other, and the two fourth pixel units Ud are arranged adjacent to each other. In detail, as shown in FIG. 18, in each repeat unit U1, the first pixel unit Ua, the first pixel unit Ua, the second pixel unit Ub, the second pixel unit Ub, the third pixel unit Uc, the third pixel unit Uc, the fourth pixel unit Ud and the fourth pixel unit Ud are sequentially arranged along the extending direction of one of the scan lines SL2.

As shown in FIG. 18, in the dimming panel 2000, the horizontal shortest distance between two adjacent data lines DL1 is approximately equal to the width of two pixel units (e.g., two first pixel units Ua, two second pixel units Ub, two third pixel units Uc or two fourth pixel units Ud), the horizontal shortest distance between two adjacent scan lines SL1 is approximately equal to the length of two pixel units, and each of the control electrodes DE corresponds to the area of four pixel units. Moreover, as shown in FIG. 18, in the dimming panel 2000, each of the control electrodes DE may overlap twenty-seven sub-pixels, for example, three first color sub-pixels S1, nine second color sub-pixels S2, nine third color sub-pixels S3 and six fourth color sub-pixels S4. In this way, in this embodiment, the resolution of the dimming panel 2000 is lower than the resolution of the display panel 1900 to avoid reducing the aperture ratio.

It should be noted that, in the present embodiment, each of the repeat units U1 includes two first pixel units Ua disposed adjacent to each other, two second pixel units Ub disposed adjacent to each other, two third pixel units Uc disposed adjacent to each other and two fourth pixel units Ud disposed adjacent to each other, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub, the arrangement of the first color sub-pixel S1, the second color sub-pixel S2, the third color sub-pixel S3 and the fourth color sub-pixel S4 in the third pixel unit Uc and the arrangement of the first color sub-pixel S1, the second color sub-pixel S2, the third color sub-pixel S3 and the fourth color sub-pixel S4 in the fourth pixel unit Ud are different from each other, and the horizontal shortest distance between two adjacent data lines DL1 is approximately equal to the width of two pixel units, such that for the whole display device 130, in each repeat unit U1, the total area shielded by the light-shielding structure SS of the first color sub-pixels S1, the total area shielded by the light-shielding structure SS of the second color sub-pixels S2, the total area shielded by the light-shielding structure SS of the third color sub-pixels S3 and the total area shielded by the light-shielding structure SS of the fourth color sub-pixels S4 are substantially equal to each other. In this way, under the shielding effect of the black matrix 212 and the light-shielding structure SS, the total aperture ratio of the first color sub-pixels S1 in the display device 130, the total aperture ratio of the second color sub-pixels S2 in the display device 130, the total aperture ratio of the third color sub-pixels S3 in the display device 130 and the total aperture ratio of the fourth color sub-pixels S4 in the display device 130 may be substantially equal to each other, thereby avoiding or reducing color moiré effect. For the rest, please refer to the foregoing embodiments, and details are not described herein.

Figure 19:
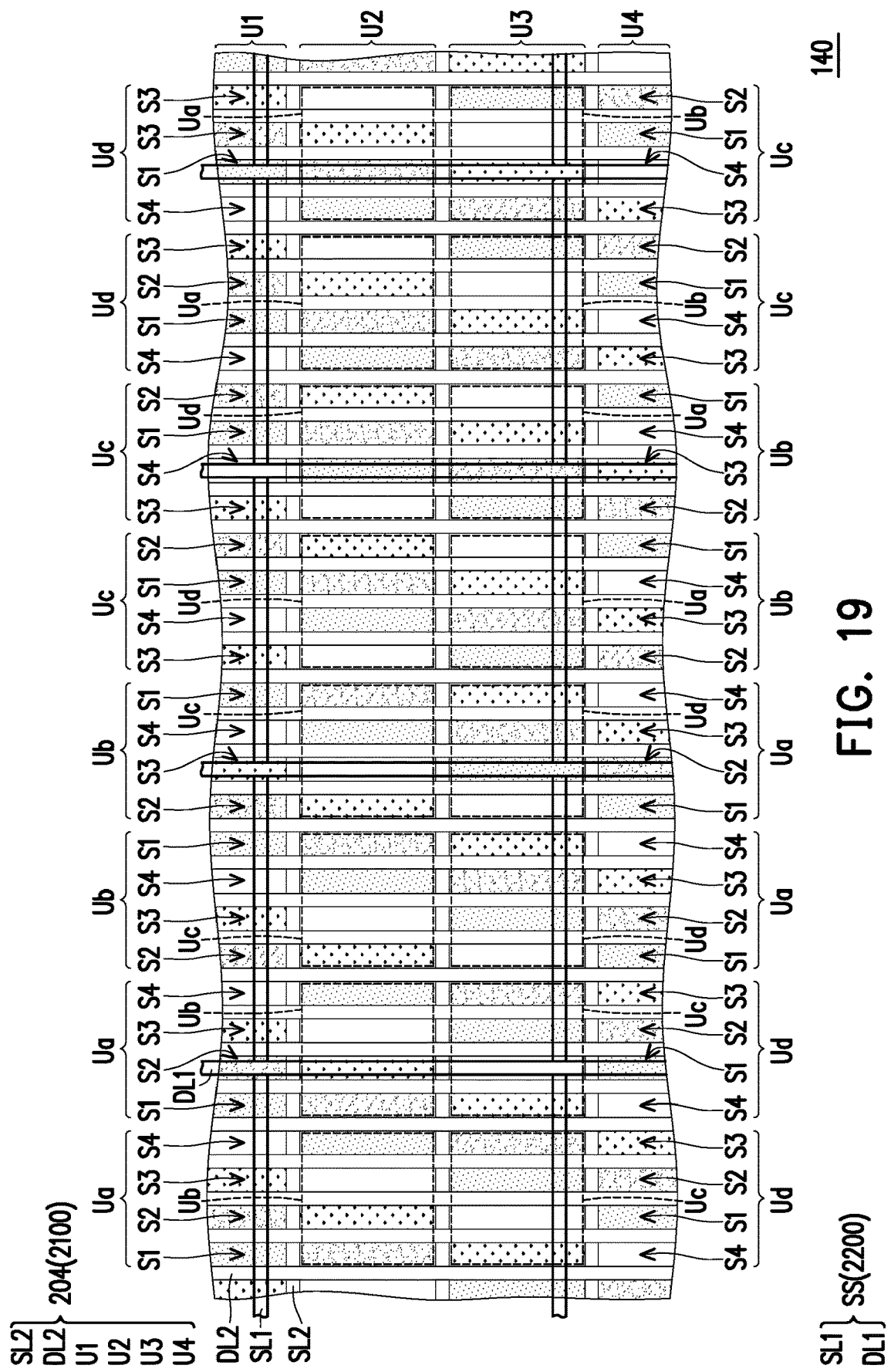
FIG. 19 is a partial schematic top view of a display device in accordance with another embodiment of the present invention.

FIG. 19 is a partial schematic top view of a display device in accordance with another embodiment of the present invention. Referring to FIG. 19 and FIG. 11, the display device 140 of FIG. 19 is similar to the display device 60 of FIG. 11, and therefore identical or similar elements are denoted by identical or similar reference numerals, and the description of the same technical contents is omitted. The omitted part of the description can refer to the foregoing embodiments. Hereinafter, the difference between the display device 140 of FIG. 19 and the display device 60 of FIG. 11 will be described. It should be noted that although many film layers and components, such as the black matrix 212, the control electrodes DE, are not illustrated in FIG. 19, according to the foregoing description of the display device 10 based on FIGS. 1 to 4, the overall structure or layout of the display device 140 should be understood by those of ordinary skill in the art.

Referring to FIG. 19, in the display panel 2100, each of the repeat unit U1, the repeat unit U2, the repeat unit U3 and the repeat unit U4 may include two first pixel units Ua, two second pixel units Ub, two third pixel units Uc and two fourth pixel units Ud, wherein the two first pixel units Ua are disposed adjacent to each other, the two second pixel units Ub are disposed adjacent to each other, the two third pixel units Uc are disposed adjacent to each other, and the two fourth pixel units Ud are disposed adjacent to each other. In detail, as shown in FIG. 19, in the repeat unit U1, the first pixel unit Ua, the first pixel unit Ua, the second pixel unit Ub, the second pixel unit Ub, the third pixel unit Uc, the third pixel unit Uc, the fourth pixel unit Ud and the fourth pixel unit Ud are sequentially arranged along the extending direction of one of the scan lines SL2; in the repeat unit U2, the second pixel unit Ub, the second pixel unit Ub, the third pixel unit Uc, the third pixel unit Uc, the fourth pixel unit Ud, the fourth pixel unit Ud, the first pixel unit Ua and the first pixel unit Ua are sequentially arranged along the extending direction of one of the scan lines SL2; in the repeat unit U3, the third pixel unit Uc, the third pixel unit Uc, the fourth pixel unit Ud, the fourth pixel unit Ud, the first pixel unit Ua, the first pixel unit Ua, the second pixel unit Ub and the second pixel unit Ub are sequentially arranged along the extending direction of one of the scan lines SL2; and in the repeat unit U4, the fourth pixel unit Ud, the fourth pixel unit Ud, the first pixel unit Ua, the first pixel unit Ua, the second pixel unit Ub, the second pixel unit Ub, the third pixel unit Uc and the third pixel unit Uc are sequentially arranged along the extending direction of one of the scan lines SL2.

As shown in FIG. 19, in the dimming panel 2200, the horizontal shortest distance between two adjacent data lines DL1 is approximately equal to the width of two pixel units (e.g., two first pixel units Ua, two second pixel units Ub, two third pixel units Uc or two fourth pixel units Ud), the horizontal shortest distance between two adjacent scan lines SL1 is approximately equal to the length of two pixel units, and each of the control electrodes DE corresponds to the area of four pixel units. Moreover, as shown in FIG. 19, in the dimming panel 2200, each of the control electrodes DE may overlap twenty-seven sub-pixels, for example, six first color sub-pixels S1, six second color sub-pixels S2, seven third color sub-pixels S3 and eight fourth color sub-pixels S4. In this way, in this embodiment, the resolution of the dimming panel 2200 is lower than the resolution of the display panel 2100 to avoid reducing the aperture ratio.

It should be noted that, in the present embodiment, each of the repeat unit U1, the repeat unit U2, the repeat unit U3 and the repeat unit U4 includes two first pixel units Ua disposed adjacent to each other, two second pixel units Ub disposed adjacent to each other, two third pixel units Uc disposed adjacent to each other, and two fourth pixel units Ud disposed adjacent to each other, the arrangement of the first color sub-pixel S1, the second color sub-pixel S2, the third color sub-pixel S3 and the fourth color sub-pixel S4 in the first pixel unit Ua, the arrangement of the first color sub-pixel S1, the second color sub-pixel S2, the third color sub-pixel S3 and the fourth color sub-pixel S4 in the second pixel unit Ub, the arrangement of the first color sub-pixel S1, the second color sub-pixel S2, the third color sub-pixel S3 and the fourth color sub-pixel S4 in the third pixel unit Uc and the arrangement of the first color sub-pixel S1, the second color sub-pixel S2, the third color sub-pixel S3 and the fourth color sub-pixel S4 in the fourth pixel unit Ud are different from each other, and the horizontal shortest distance between two adjacent data lines DL1 is approximately equal to the width of two pixel units, such that for the whole display device 140, in each of the repeat unit U1, the repeat unit U2, the repeat unit U3 and the repeat unit U4, the total area shielded by the light-shielding structure SS of the second color sub-pixels S2, the total area shielded by the light-shielding structure SS of the third color sub-pixels S3 and the total area shielded by the light-shielding structure SS of the fourth color sub-pixels S4 are substantially equal to each other. In this way, under the shielding effect of the black matrix 212 and the light-shielding structure SS, the total aperture ratio of the first color sub-pixels S1 in the display device 140, the total aperture ratio of the second color sub-pixels S2 in the display device 140, the total aperture ratio of the third color sub-pixels S3 in the display device 140 and the total aperture ratio of the fourth color sub-pixels S4 in the display device 140 may be substantially equal to each other, thereby avoiding or reducing color moiré effect. For the rest, please refer to the foregoing embodiments, and details are not described herein.

In addition, although the foregoing descriptions of FIGS. 12 to 19 only disclose the embodiments in which the horizontal shortest distance between two adjacent data lines DL1 is approximately equal to the width of two or three pixel units and the horizontal shortest distance between two adjacent scan lines SL1 is approximately equal to the length of two or three pixel units, according to the foregoing descriptions of the display devices 10 to 140, it should be understood by those of ordinary skill in the art that when the shortest distance between two adjacent data lines DL1 is approximately equal to the width of N pixel units, wherein N is an integer of 2 or more, each of the repeat units in the display device at least includes N first pixel units Ua disposed adjacent to each other, N second pixel units Ub disposed adjacent to each other and N third pixel units Uc disposed adjacent to each other, and the arrangement of the first color sub-pixel S1, the second color sub-pixel S2 and the third color sub-pixel S3 in the first pixel unit Ua, the arrangement of the first color sub-pixel S1, the second color sub-pixel S2 and the third color sub-pixel S3 in the second pixel unit Ub and the arrangement of the first color sub-pixel S1, the second color sub-pixel S2 and the third color sub-pixel S3 in the third pixel unit Uc are different from each other, so that the display device can avoid or reduce the occurrence of color moiré effect.

Based on the above, in the display device according to at least one embodiment of the present invention, the dimming panel disposed on the backlight module includes the light-shielding structure and the control electrodes, the display panel disposed on the dimming panel includes the repeat unit having at least one first pixel unit, at least one second pixel unit and at least one third pixel unit, each of the at least one first pixel unit, the at least one second pixel unit and the at least one third pixel unit includes the first color sub-pixel, the second color sub-pixel and the third color sub-pixel, the arrangement of the first color sub-pixel, the second color sub-pixel and the third color sub-pixel in the first pixel unit, the arrangement of the first color sub-pixel, the second color sub-pixel and the third color sub-pixel in the second pixel unit and the arrangement of the first color sub-pixel, the second color sub-pixel and the third color sub-pixel in the third pixel unit are different from each other, and the total area shielded by the light-shielding structure of the first color sub-pixels in the repeat unit, the total area shielded by the light-shielding structure of the second color sub-pixels in the repeat unit and the total area shielded by the light-shielding structure of the third color sub-pixels in the repeat unit are substantially equal to each other, so that the display device can have high contrast, good transmittance and can avoid or reduce color moiré effect.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device, comprising:
 a backlight module;
 a dimming panel disposed on the backlight module, wherein the dimming panel comprises:
   a light-shielding structure;
   a plurality of first active elements; and
   a plurality of control electrodes, wherein each of the control electrodes is electrically connected to one of the first active elements; and
 a display panel disposed on the backlight module and comprising:
   a first repeat unit comprising a first pixel unit, a second pixel unit and a third pixel unit being sequentially arranged along a first direction; and
   a second repeat unit comprising the second pixel unit, the third pixel unit, and the first pixel unit being sequentially arranged along the first direction, wherein the first repeat unit and the second repeat unit are arranged along a second direction perpendicular to the first direction, and
  the first pixel unit of the first repeat unit is aligned with the second pixel unit of the second repeat unit along the second direction, the second pixel unit of the first repeat unit is aligned with the third pixel unit of the second repeat unit along the second direction, and the third pixel unit of the first repeat unit is aligned with the first pixel unit of the second repeat unit along the second direction; wherein
  the first pixel unit of each of the first repeat unit and the second repeat unit comprises a first color sub-pixel, a second color sub-pixel, a third color sub-pixel, and a fourth color sub-pixel being sequentially arranged along the first direction, the second pixel unit of each of the first repeat unit and the second repeat unit comprises the second color sub-pixel, the third color sub-pixel, the first color sub-pixel, and the fourth color sub-pixel being sequentially arranged along the first direction, and the third pixel unit of each of the first repeat unit and the second repeat unit comprises the third color sub-pixel, the first color sub-pixel, the second color sub-pixel, and the fourth color sub-pixel being sequentially arranged along the first direction, so that a total area shielded by the light-shielding structure of the first color sub-pixels in the first repeat unit, a total area shielded by the light-shielding structure of the second color sub-pixels in the first repeat unit, a total area shielded by the light-shielding structure of the third color sub-pixels in the first repeat unit, and a total area shielded by the light-shielding structure of the fourth color sub-pixels in the first repeat unit are substantially equal.

2. The display device of claim 1, wherein an area of one of the first color sub-pixels, the second color sub-pixels and the third color sub-pixels is A, and an area shielded by the light-shielding structure of the one is B, 0%<B/A<65%.

3. The display device of claim 1, wherein in the second repeat unit, a total area shielded by the light-shielding structure of the first color sub-pixels, a total area shielded by the light-shielding structure of the second color sub-pixels and a total area shielded by the light-shielding structure of the third color sub-pixels are substantially equal.

4. The display device of claim 1, wherein the first repeat unit further comprises another first pixel unit, another second pixel unit and another third pixel unit, and wherein the first pixel units of the first repeat unit are disposed adjacent to each other, the second pixel units of the first repeat unit are disposed adjacent to each other, and the third pixel units of the first repeat unit are disposed adjacent to each other.

5. The display device of claim 1, wherein in the second repeat unit, a total area shielded by the light-shielding structure of the first color sub-pixels, a total area shielded by the light-shielding structure of the second color sub-pixels, a total area shielded by the light-shielding structure of the third color sub-pixels and a total area shielded by the light-shielding structure of the fourth color sub-pixels are substantially equal.

6. The display device of claim 1, wherein the first repeat unit further comprises another first pixel and wherein, another second pixel and wherein, another third pixel and wherein and a plurality of fourth pixel units, and wherein the first pixel units of the first repeat unit are disposed adjacent to each other, the second pixel units of the first repeat unit are disposed adjacent to each other, the third pixel units of the first repeat unit are disposed adjacent to each other, and the fourth pixel units of the first repeat unit are disposed adjacent to each other.

7. The display device of claim 1, wherein the light-shielding structure comprises a plurality of first scan lines and a plurality of first data lines, wherein the first active elements are respectively electrically connected to one of the first scan lines and one of the first data lines.

8. The display device of claim 7, wherein the light-shielding structure further comprises a black matrix overlapping the first scan lines and the first data lines.

9. The display device of claim 7, wherein the display panel further comprises:

a plurality of second scan lines and a plurality of second data lines, wherein the first color sub-pixels, the second color sub-pixels and the third color sub-pixels are respectively electrically connected to one of the second scan lines and one of the second data lines, an extending direction of each of the first scan lines is parallel to an extending direction of each of the second scan lines, and an extending direction of each of the first data lines is parallel to an extending direction of each of the second data lines; and a plurality of first color filter patterns, a plurality of second color filter patterns and a plurality of third color filter patterns respectively disposed corresponding to the first color sub-pixels, the second color sub-pixels and the third color sub-pixels.

10. The display device of claim 9, wherein the first direction is the extending direction of one of the second scan lines, and wherein the first color filter patterns are red, the second color filter patterns are green and the third color filter patterns are blue.

11. The display device of claim 1, wherein each of the control electrodes is disposed corresponding to at least one of the first color sub-pixels, at least one of the second color sub-pixels and at least one of the third color sub-pixels.

12. The display device of claim 11, wherein the dimming panel further comprises a first liquid crystal layer overlapping the control electrodes; and the display panel further comprises a second liquid crystal layer overlapping the first repeat unit, wherein each of the first color sub-pixels, each of the second color sub-pixels and each of the third color sub-pixels respectively comprise:

a second active element; and a pixel electrode electrically connected to the second active element.

13. The display device of claim 1, wherein the display panel further comprises:

a third repeat unit comprising the third pixel unit, the first pixel unit and the second pixel unit being sequentially arranged along the first direction, wherein the first repeat unit, the second repeat unit and the third repeat unit are arranged along the second direction so that the second repeat unit is located between the third repeat unit and the first repeat unit, wherein the third pixel unit of the third repeat unit is aligned with the second pixel unit of the second repeat unit along the second direction, the first pixel unit of the third repeat unit is aligned with the third pixel unit of the second repeat unit along the second direction, and the second pixel unit of the third repeat unit is aligned with the first pixel unit of the second repeat unit along the second direction, and wherein the first pixel unit of the third repeat unit comprises the first color sub-pixel, the second color sub-pixel, the third color sub-pixel, and the fourth color sub-pixel being sequentially arranged along the first direction, the second pixel unit of the third repeat unit comprises the second color sub-pixel, the third color sub-pixel, the first color sub-pixel, and the fourth color sub-pixel being sequentially arranged along the first direction, and the third pixel unit of the third repeat unit comprises the third color sub-pixel, the first color sub-pixel, the second color sub-pixel, and the fourth color sub-pixel being sequentially arranged along the first direction, so that in each of the first repeat unit, the second repeat unit and the third repeat unit, a total area shielded by the light-shielding structure of the first color sub-pixels, a total area shielded by the light-shielding structure of the second color sub-pixels, a total area shielded by the light-shielding structure of the third color sub-pixels and a total area shielded by the light-shielding structure of the fourth color sub-pixels are substantially equal.

14. The display device of claim 1, wherein
the first repeat unit further comprises:
  another first pixel unit, wherein the first pixel units of the first repeat unit are disposed adjacent to each other;
  another second pixel unit, wherein the second pixel units of the first repeat unit are disposed adjacent to each other; and
  another third pixel unit, wherein the third pixel units of the first repeat unit are disposed adjacent to each other, and wherein the first pixel units of the first repeat unit, the second pixel units of the first repeat unit, and the third pixel units of the first repeat unit are sequentially arranged along the first direction;
the second repeat unit further comprises:
  another third pixel unit, wherein the third pixel units of the second repeat unit are disposed adjacent to each other;
  another first pixel unit, wherein the first pixel units of the second repeat unit are disposed adjacent to each other, and
  another second pixel unit, wherein the second pixel units of the second repeat unit are disposed adjacent to each other, and wherein the second pixel units of the second repeat unit, the third pixel units of the second repeat unit, and the first pixel units of the second repeat unit are sequentially arranged along the first direction; and
a third repeat unit comprises the third pixel units disposed adjacent to each other, the first pixel units disposed adjacent to each other, and the second pixel units disposed adjacent to each other, wherein the third pixel units of the third repeat unit, the first pixel units of the third repeat unit and the second pixel units of the third repeat unit are sequentially arranged along the first direction, wherein
the third pixel units of the third repeat unit, the first pixel units of the first repeat unit and the second pixel units of the second repeat unit are aligned along the second direction,
the first pixel units of the third repeat unit, the second pixel units of the first repeat unit and the third pixel units of the second repeat unit are aligned along the second direction,
the second pixel units of the third repeat unit, the third pixel units of the first repeat unit and the first pixel units of the second repeat unit are aligned along the second direction, and
the third repeat unit, the first repeat unit and the second repeat unit are not overlapped, wherein the second repeat unit is located between the third repeat unit and the first repeat unit, wherein
each of first pixel units of the second repeat unit is located between a corresponding one second pixel unit of the third repeat unit and a corresponding one third pixel unit of the first repeat unit along the second direction,
each of second pixel units of the second repeat unit is located between a corresponding one first pixel unit of the first repeat unit and a corresponding one third pixel unit of the third repeat unit along the second direction, and
each of third pixel units of the second repeat unit is located between a corresponding one first pixel unit of the third repeat unit and a corresponding one second pixel unit of the first repeat unit along the second direction.

15. A display device, comprising:
a backlight module;
a dimming panel disposed on the backlight module, wherein the dimming panel comprises:
a light-shielding structure;
a plurality of first active elements; and
a plurality of control electrodes, wherein each of the control electrodes is electrically connected to one of the first active elements; and
a display panel disposed on the backlight module and comprising:
  a first repeat unit comprising two first pixel units, two second pixel units and two third pixel units being sequentially arranged along a first direction; and
  a second repeat unit comprising the two second pixel units, the two third pixel units, and the two first pixel units being sequentially arranged along the first direction, wherein the first repeat unit and the second repeat unit are arranged along a second direction perpendicular to the first direction, and
the two first pixel units of the first repeat unit are aligned with the two second pixel units of the second repeat unit along the second direction, the two second pixel units of the first repeat unit are aligned with the two third pixel units of the second repeat unit along the second direction, and the two third pixel units of the first repeat unit are aligned with the two first pixel units of the second repeat unit along the second direction; wherein
each of the two first pixel units of each of the first repeat unit and the second repeat unit comprises a first color sub-pixel, a second color sub-pixel, a third color sub-pixel, and a fourth color sub-pixel being sequentially arranged along the first direction,
each of the two second pixel units of each of the first repeat unit and the second repeat unit comprises the second color sub-pixel, the third color sub-pixel, the first color sub-pixel, and the fourth color sub-pixel being sequentially arranged along the first direction, and
each of the two third pixel units of each of the first repeat unit and the second repeat unit comprises the third color sub-pixel, the first color sub-pixel, the second color sub-pixel, and the fourth color sub-pixel being sequentially arranged along the first direction, so that a total area shielded by the light-shielding structure of the first color sub-pixels in the first repeat unit, a total area shielded by the light-shielding structure of the second color sub-pixels in the first repeat unit, a total area shielded by the light-shielding structure of the third color sub-pixels in the first repeat unit and a total area shielded by the light-shielding structure of the fourth color sub-pixels in the first repeat unit are substantially equal.

16. The display device of claim 15, wherein the display panel further comprises:
a third repeat unit comprising the two third pixel units, the two first pixel units and the two second pixel units being sequentially arranged along the first direction, wherein the first repeat unit, the second repeat unit and the third repeat unit are arranged along the second direction so that the second repeat unit is located between the third repeat unit and the first repeat unit, wherein the two third pixel units of the third repeat unit is aligned with the two second pixel units of the second repeat unit along the second direction, the two first pixel units of the third repeat unit is aligned with the two third pixel units of the second repeat unit along the second direction, and the two second pixel units of the third repeat unit is aligned with the two first pixel units of the second repeat unit along the second direction, and wherein each of the two first pixel units of the third repeat unit comprises the first color sub-pixel, the second color sub-pixel, the third color sub-pixel, and the fourth color sub-pixel being sequentially arranged along the first direction, each of the two second pixel units of the third repeat unit comprises the second color sub-pixel, the third color sub-pixel, the first color sub-pixel, and the fourth color sub-pixel being sequentially arranged along the first direction, and each of the two third pixel units of the third repeat unit comprises the third color sub-pixel, the first color sub-pixel, the second color sub-pixel, and the fourth color sub-pixel being sequentially arranged along the first direction, so that in each of the first repeat unit, the second repeat unit and the third repeat unit, a total area shielded by the light-shielding structure of the first color sub-pixels, a total area shielded by the light-shielding structure of the second color sub-pixels, a total area shielded by the light-shielding structure of the third color sub-pixels and a total area shielded by the light-shielding structure of the fourth color sub-pixels are substantially equal.

* * * * *